(12) United States Patent
Houde et al.

(10) Patent No.: US 12,165,183 B2
(45) Date of Patent: Dec. 10, 2024

(54) SERVER DEVICE, NON-TRANSITORY COMPUTER READABLE MEDIUM, AND METHOD FOR MANAGING MULTIPLE TRANSACTIONAL WORKFLOWS

(71) Applicant: The Toronto-Dominion Bank, Toronto (CA)

(72) Inventors: Brigitte Houde, Montreal (CA); Fabiola Siracusa, Laval (CA); Norman Lok Man Chan, Toronto (CA); Karthick Sudantharam, Brampton (CA)

(73) Assignee: The Toronto-Dominion Bank, Toronto (CA)

( * ) Notice: Subject to any disclaimer, the term of this patent is extended or adjusted under 35 U.S.C. 154(b) by 113 days.

(21) Appl. No.: 17/305,468

(22) Filed: Jul. 8, 2021

(65) Prior Publication Data
US 2023/0007880 A1    Jan. 12, 2023

(51) Int. Cl.
*G06Q 30/00* (2023.01)
*G06Q 10/0633* (2023.01)
*G06Q 30/0601* (2023.01)

(52) U.S. Cl.
CPC ..... *G06Q 30/0611* (2013.01); *G06Q 10/0633* (2013.01); *G06Q 30/0627* (2013.01); *G06Q 30/0635* (2013.01)

(58) Field of Classification Search
CPC .......... G06Q 30/0611; G06Q 30/0627; G06Q 30/0635
(Continued)

(56) References Cited

U.S. PATENT DOCUMENTS 6,986,138 B1   1/2006 Sakaguchi et al.
7,069,179 B2   6/2006 Kim et al.
(Continued)

FOREIGN PATENT DOCUMENTS

EP   2889816 A1   7/2015

OTHER PUBLICATIONS

McDonald, C. (2001). Aggregators are needed, but few will survive. National Underwriter, 105(13), S20-S21. Retrieved from https://www.proquest.com/trade-journals/aggregators-are-needed-few-will-survive/docview/228511589/se-2 (Year: 2001).*

*Primary Examiner* — Arielle E Weiner
(74) *Attorney, Agent, or Firm* — CPST Intellectual Property Inc.; Brett J. Slaney

(57) ABSTRACT

A system and method are provided for managing multiple transactional workflows. The method includes saving each transactional workflow with a unique identifier, mapping the unique identifier to an entity associated with the client device used to initiate the corresponding transactional workflow, providing a first option for the client device to retrieve from the server device details of the plurality of transactional workflows, and receiving a request at a later time to retrieve details of the plurality of transactional workflows. The method also includes performing an authentication process, using the predetermined identifying information to determine unique identifiers of the corresponding saved transactional workflows, providing a second option for the client device to resume one or more of the transactional workflows, and resuming the corresponding one or more transactional workflows. Each transactional workflow is saved in a format that permits the server device to execute and complete a binding outcome.

19 Claims, 15 Drawing Sheets

(58) Field of Classification Search
USPC .......................................................... 705/26.4
See application file for complete search history.

(56) References Cited

U.S. PATENT DOCUMENTS

| | | | |
|---|---|---|---|
| 8,176,145 B1* | 5/2012 | Stender | G06Q 40/08 |
| | | | 709/219 |
| 8,688,498 B2 | 4/2014 | Tsuda et al. | |
| 9,258,355 B2 | 2/2016 | Chandra et al. | |
| 9,652,805 B1* | 5/2017 | Clawson, II | G06Q 40/08 |
| 9,672,487 B1 | 6/2017 | Garcia et al. | |
| 10,078,674 B2 | 9/2018 | Muthuvelu | |
| 10,331,416 B2 | 6/2019 | Chaudhry et al. | |
| 10,474,977 B2 | 11/2019 | Stevens et al. | |
| 11,574,242 B1* | 2/2023 | Burke | G06F 16/2477 |
| 2007/0156486 A1 | 7/2007 | Sanabria et al. | |
| 2010/0114780 A1 | 5/2010 | Tribe et al. | |
| 2011/0276915 A1 | 11/2011 | Freire et al. | |
| 2013/0158964 A1 | 6/2013 | Hall et al. | |
| 2013/0179208 A1 | 7/2013 | Chung et al. | |
| 2013/0339219 A1* | 12/2013 | Bernheimer | G06Q 40/025 |
| | | | 705/38 |
| 2014/0082749 A1* | 3/2014 | Holland | G06F 21/60 |
| | | | 726/29 |
| 2014/0278582 A1* | 9/2014 | Shambach | G06Q 40/08 |
| | | | 705/4 |
| 2015/0127607 A1* | 5/2015 | Savage | G06F 16/1873 |
| | | | 707/693 |
| 2015/0161546 A1 | 6/2015 | Stoyanov | |
| 2015/0248730 A1* | 9/2015 | Pilot | G06Q 10/06 |
| | | | 705/4 |
| 2017/0039492 A1 | 2/2017 | Henke et al. | |
| 2019/0391972 A1* | 12/2019 | Bates | G06F 3/04842 |
| 2020/0167861 A1* | 5/2020 | Ramaswamy | G06F 16/2468 |
| 2021/0264535 A1* | 8/2021 | Hatch | G06F 16/288 |
| 2021/0397522 A1* | 12/2021 | Owen | G06F 16/128 |

* cited by examiner

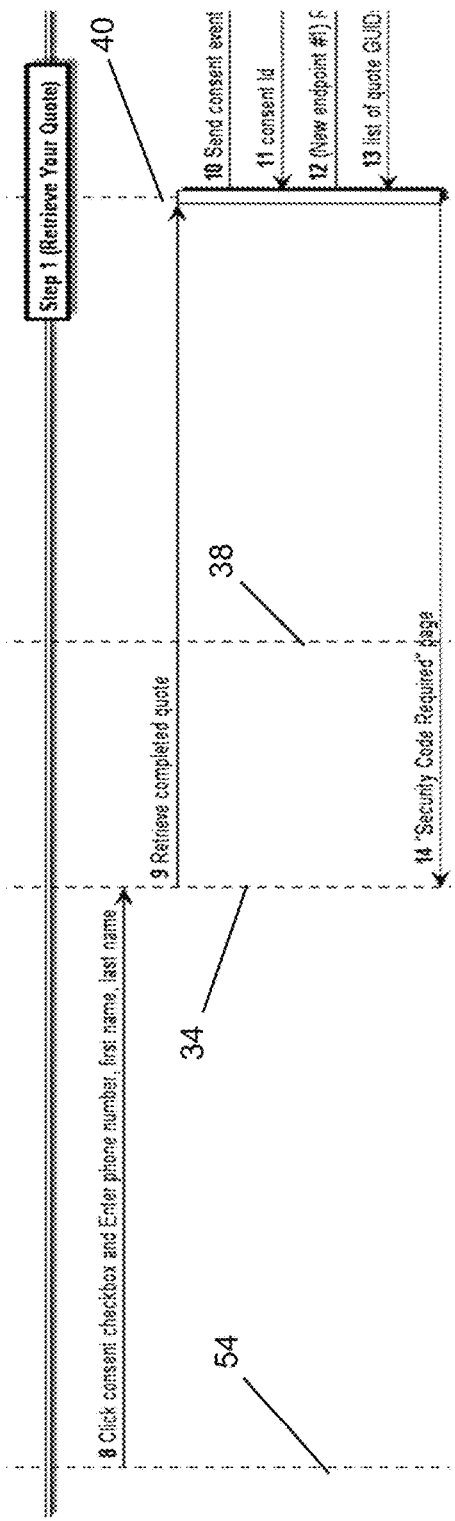
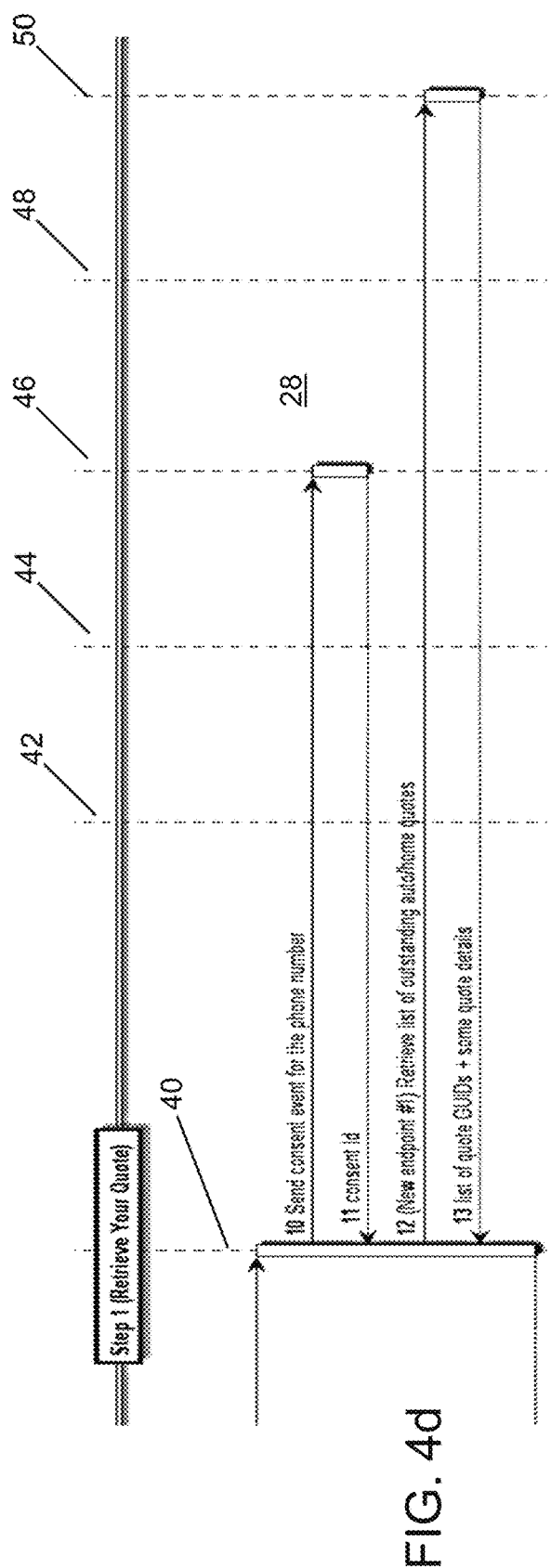
FIG. 4c
FIG. 4d

FIG. 10

SERVER DEVICE, NON-TRANSITORY COMPUTER READABLE MEDIUM, AND METHOD FOR MANAGING MULTIPLE TRANSACTIONAL WORKFLOWS

TECHNICAL FIELD

The following relates generally to managing multiple transactional workflows.

BACKGROUND

When obtaining an insurance quote using an online tool such as an application (app) or a website, customers often wish to begin the process and return or resume the online process at a later time. Customers may also be reviewing multiple insurance products and it can be time consuming and cumbersome to stop and restart and keep track of any open quotes without a reminder system or other mechanism to keep the customer engaged. Moreover, providing summary quotes or non-binding cost estimates can be ineffective since customers may believe that the "real" cost would be something different and therefore may move on to other quotes or turn their attention to a competing product or service. These challenges may also be felt in other online transactional workflows in which customers desire to begin, save, and resume the workflows later.

BRIEF DESCRIPTION OF THE DRAWINGS

Embodiments will now be described with reference to the appended drawings wherein:

FIGS. 4a-4j are portions of a sequence diagram for retrieving an in-progress transactional workflow using the transactional workflow system.

FIG. 10 is an example of a graphical user interface for displaying multiple retrieved quotes to enable resumption of same.

DETAILED DESCRIPTION

Figure 1:
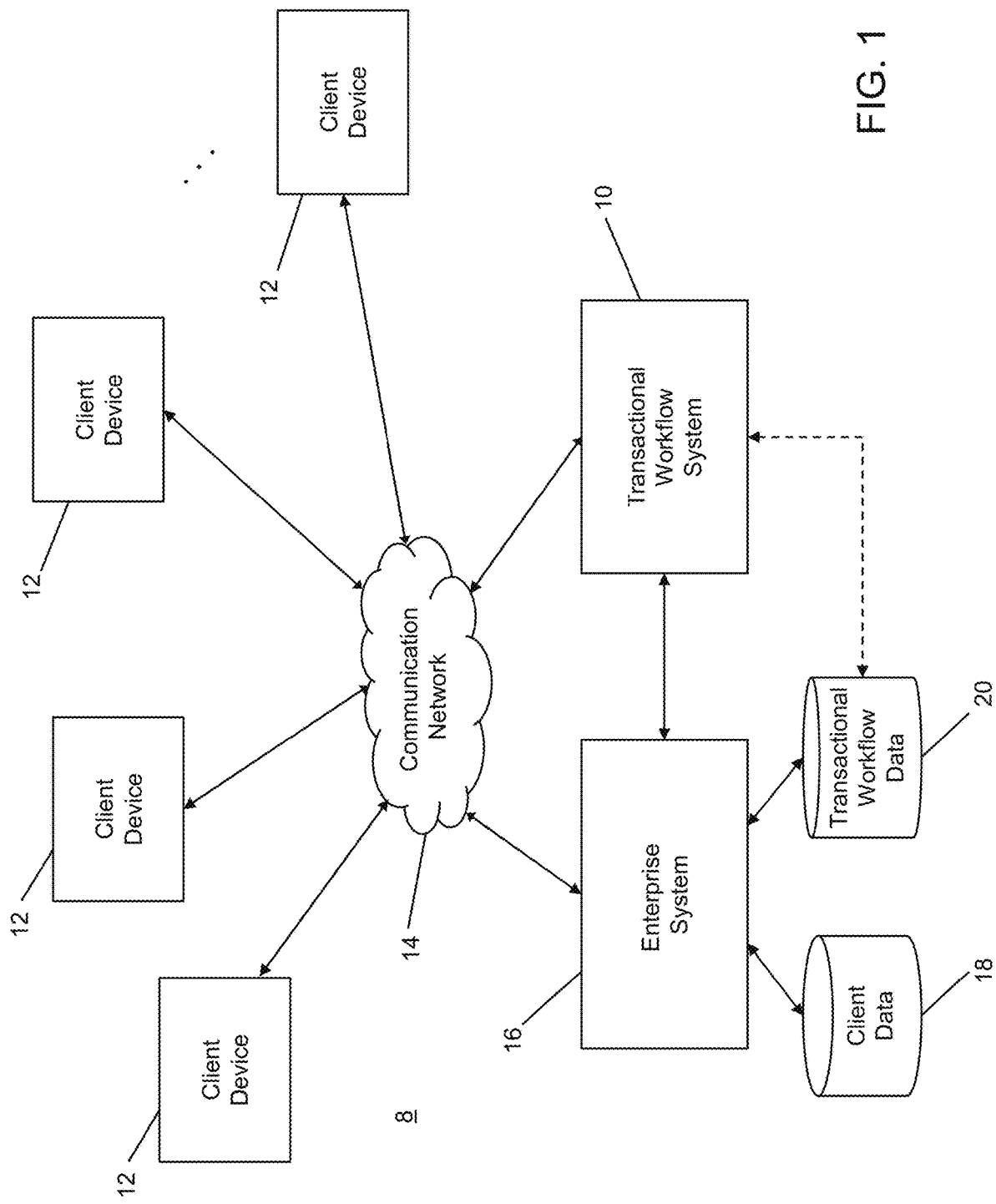
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Currently, insurance customers may have limited options for obtaining, saving, and resuming a quote using an electronic transactional workflow. For example, such workflows are found to not provide enough flexibility to retrieve a pending quote or estimate from a website or through an app, if needed. Adding more flexibility and giving customers the choice to retrieve a quote that can be restarted and made binding, from different devices and using different channels should encourage customers to use and carry forward quotes on such insurance products more readily. Similar rationale applies to other quote-based services that traditionally do not offer the flexibility to start, save, resume and have the same workflow made binding without the need to restart or redouble efforts.

The following describes a system configured to provide an enhanced customer experience where, after saving of a quote, the customer can go back to the app or website to enter specific validation information to retrieve the quote that has been saved by the system in a way that enables resumption to lead to a binding outcome without the need to re-enter information, thus reducing computing efforts at both the client device and the server device. Advantageously, the system not only permits a quote process to be resumed but can save multiple quotes and retrieve those quotes to provide access to quotes that have not expired. Additionally, since the quotes are progressed, saved, and completed as binding quotes, this permits maximum flexibility for the user to stop and start the process without derailing progress and, importantly, allowing them to complete the process to its outcome upon retrieving and resuming the corresponding data from the server device. This is in contrast to summary or "quick" quotes that provide a rough estimate but then require an additional approval process or entirely separate process to be implemented to act on the general terms indicated in the quick quote.

It will be appreciated that while examples provided herein are directed to insurance policies and financial-related transactions, the principles discussed herein equally apply to other electronic workflows that can be progressed, saved and completed as binding quotes, for a client or customer of an enterprise or organization. For example, the principles discussed herein can be readily adapted to digital media providers (e.g., phone, television, internet, mobile, home security), or other bundles of products and/or services (e.g., financial transaction accounts, credit accounts, investment accounts), etc.

Certain example systems and methods described herein are able to manage the initiation, progress, storage, and retrieval of multiple transactional workflows. In one aspect, there is provided a server device for managing multiple transactional workflows. The device includes a processor, a communications module coupled to the processor, and a memory coupled to the processor. The memory stores computer executable instructions that when executed by the processor cause the processor to permit a plurality of transactional workflows for a product or service to be initiated, at least partially completed, and saved by a client device prior to completion. The memory also stores computer executable instructions that when executed by the processor cause the processor to save each transactional workflow with a unique identifier, map the unique identifier to an entity associated with the client device used to initiate the corresponding transactional workflow, and provide a first option for the client device to retrieve from the server device details of the plurality of transactional workflows. The memory also stores computer executable instructions that when executed by the processor cause the processor to receive via the communications module, a request at a later time to retrieve details of the plurality of transactional workflows; perform via the communications module, an authentication process by accepting predetermined identifying information for the entity; and use the predetermined identifying information to determine the unique identifiers of the corresponding saved transactional workflows. The memory also stores computer executable instructions that when executed by the processor cause the processor to provide a second option for the client device to resume one or more of the transactional workflows and resume the corresponding one or more transactional workflows when receiving a corresponding selection associated with the second option. Each transactional workflow is saved in a format that permits the server device to execute and complete a binding outcome in obtaining the product or service upon resumption of the transactional workflow.

In another aspect, there is provided a method of managing multiple transactional workflows. The method is executed by a server device having a communications module. The method includes permitting a plurality of transactional workflows for a product or service to be initiated, at least partially completed, and saved by a client device prior to completion. The method also includes saving each transactional workflow with a unique identifier, mapping the unique identifier to an entity associated with the client device used to initiate the corresponding transactional workflow, and providing a first option for the client device to retrieve from the server device details of the plurality of transactional workflows. The method also includes receiving via the communications module, a request at a later time to retrieve details of the plurality of transactional workflows; performing via the communications module, an authentication process by accepting predetermined identifying information for the entity; and using the predetermined identifying information to determine the unique identifiers of the corresponding saved transactional workflows. The method also includes providing a second option for the client device to resume one or more of the transactional workflows and resuming the corresponding one or more transactional workflows when receiving a corresponding selection associated with the second option. Each transactional workflow is saved in a format that permits the server device to execute and complete a binding outcome in obtaining the product or service upon resumption of the transactional workflow.

In another aspect, there is provided non-transitory computer readable medium for permitting a plurality of transactional workflows for a product or service to be initiated, at least partially completed, and saved by a client device prior to completion. The computer readable medium includes computer executable instructions for saving each transactional workflow with a unique identifier, mapping the unique identifier to an entity associated with the client device used to initiate the corresponding transactional workflow, and providing a first option for the client device to retrieve from the server device details of the plurality of transactional workflows. The computer readable medium also includes computer executable instructions for receiving via a communications module, a request at a later time to retrieve details of the plurality of transactional workflows; performing via the communications module, an authentication process by accepting predetermined identifying information for the entity; and using the predetermined identifying information to determine the unique identifiers of the corresponding saved transactional workflows. The computer readable medium also includes computer executable instructions for providing a second option for the client device to resume one or more of the transactional workflows; and resuming the corresponding one or more transactional workflows when receiving a corresponding selection associated with the second option. Each transactional workflow is saved in a format that permits the server device to execute and complete a binding outcome in obtaining the product or service upon resumption of the transactional workflow.

In certain example embodiments, the identifying information can include limited information to avoid storing personally identifiable information during a current session and not returning the personally identifiable information until the client device is authenticated. The limited identifying information can include a phone number used to initiate the authentication process using a security code.

In certain example embodiments, the service device can be configured to track an expiry date associated with a corresponding transactional workflow; mark an expired transactional workflow as such; and provide via the communications module, an indication of the expiration to the client device. The indication of the expiration date can be provided when attempting to retrieve the expired transactional workflow. The indication of the expiration date can also be provided prior to the expiry date to enable resumption of the corresponding transactional workflow prior to the expiry date. The server device can also be configured to enable the expired transactional workflow to be restarted. A restarted transactional workflow can be used to eliminate at least one step performed in the original transactional workflow.

In certain example embodiments, the request can be initiated from a reminder sent to the client device by the server device via the communications module.

In certain example embodiments, the request can be initiated from a link provided within a website. The website can include an account for the entity associated with the client device.

FIG. 1 illustrates an exemplary computing environment 8. In one aspect, the computing environment 8 may include a transactional workflow system 10, one or more client devices 12, and a communications network 14 connecting one or more components of the computing environment 8.

The computing environment 8 may also include an enterprise system 16 (e.g., a financial institution such as commercial bank and/or insurance provider) that provides financial services accounts to users and processes financial transactions associated with those financial service accounts. While several details of the enterprise system 16 have been omitted for clarity of illustration, reference will be made to FIG. 6 below for additional details.

The enterprise system 16 includes or otherwise has access to a datastore for storing client data 18 and a datastore for storing transactional workflow data 20. The transactional workflow system 10 may have has access to the client data 18 via the enterprise system 16. The transactional workflow system 10 may also have access to the workflow data 20 via the enterprise system 16 or by direct access, as shown in dashed lines in FIG. 1. The client data 18 may include both data associated with a user of a client device 12 that interacts with the transactional workflow system 10 and the enterprise system 16 (e.g., for obtaining insurance policies and/or participating in mobile banking) and transaction history data that is captured and provided with a transaction entry, e.g., in the graphical user interface of a mobile or web-based banking application. The data associated with a user can include client profile data that may be mapped to corresponding financial data 88 (see FIG. 6) for that user. It can be appreciated that the financial data 88 shown in FIG. 6 could also include transaction data and/or the client data 18 shown in FIG. 1 and these datastores are shown separately for illustrative purposes. The client data 18 can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client data 18 or workflow data 20 may also include historical interactions and transactions associated with the transactional workflow system 10 and/or enterprise system 16, e.g., login history, search history, communication logs, documents, etc.

Figure 6:
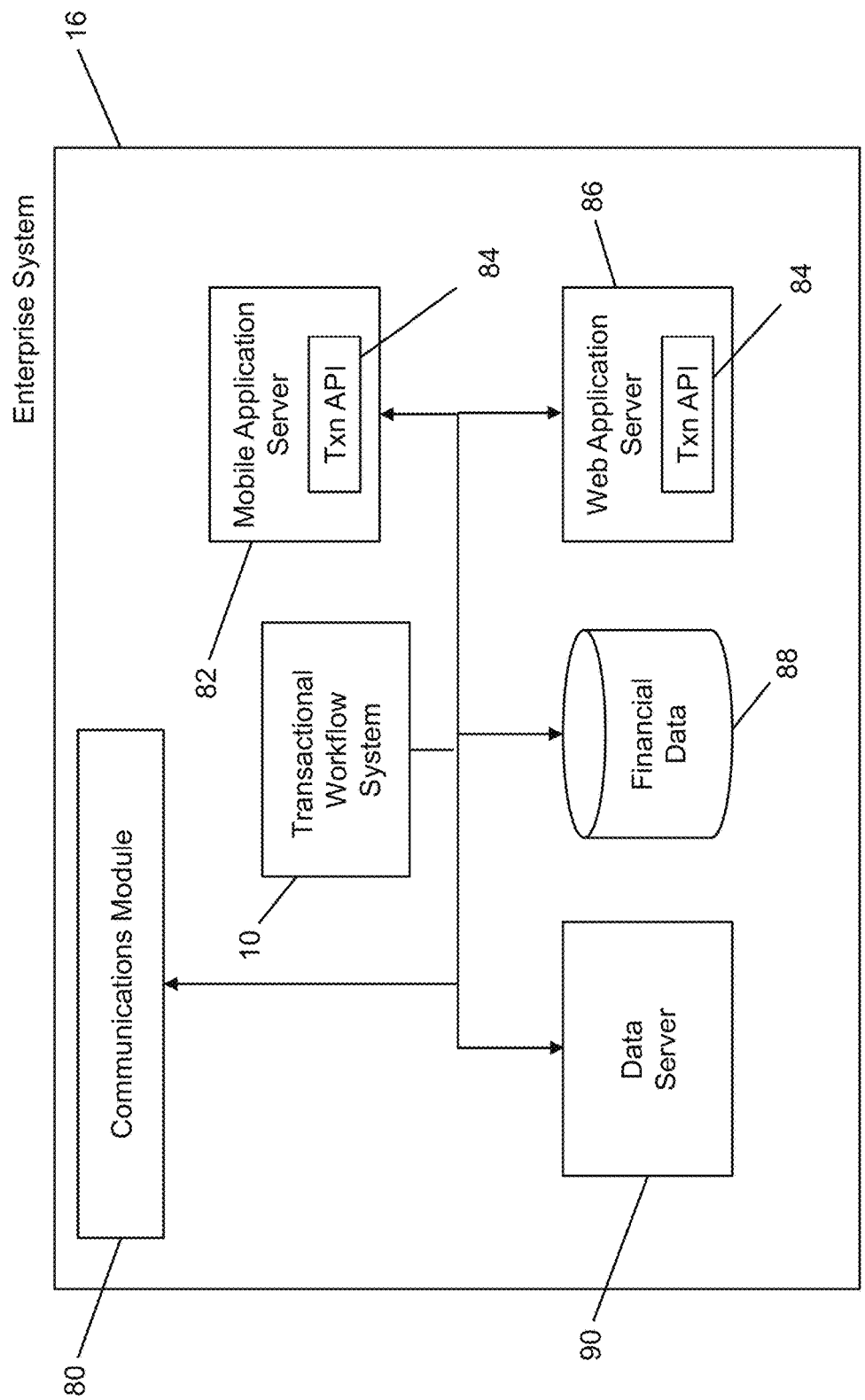
FIG. 6 is a block diagram of an example configuration of an enterprise system.

It can be appreciated that while the transactional workflow system 10 and enterprise system 16 are shown as separate entities in FIG. 1, they may also be part of the same system. For example, the transactional workflow system 10 can be hosted and provided within the enterprise system 16 as illustrated in FIG. 6.

Client devices 12 may be associated with one or more users. Users may be referred to herein as customers, clients, policy holders, correspondents, or other entities that interact with the enterprise system 16 and/or transactional workflow system 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based insurance application which uses or incorporates the transactional workflow system 10 to assist in providing, storing, retrieving, and completing multiple independent transactional workflows associated with quotes or estimates for insurance products and services, and/or to add or change information and data associated with products or services, such as insurance policies.

In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, transactional workflow system 10 may be implemented using one or more computer systems (e.g., server devices) configured to process and store information and execute software instructions to perform one or more processes consistent with the disclosed embodiments. In certain embodiments, although not required, transactional workflow system 10 may be associated with one or more business entities. In certain embodiments, transactional workflow system 10 may represent or be part of any type of business entity. For example, transactional workflow system 10 may be a system associated with a commercial bank and/or insurance company (e.g., enterprise system 16), a digital media service provider, or some other type of business having multiple parallel transactional workflows such as for providing quotes/estimates to customers and to carry those quotes/estimates through to binding outcomes such as the purchase of an insurance policy. The transactional workflow system 10 can also operate as a standalone entity that is configured to serve multiple business entities, e.g., to act as an agent therefor.

Referring back to FIG. 1, the transactional workflow system 10 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the transactional workflow system 10 and enterprise system 16. The cryptographic server may be used to protect the financial data 88 and/or client data 18 and/or workflow data 20 by way of encryption for data protection, digital signatures or message digests for data integrity, and by using digital certificates to authenticate the identity of the users and client devices 12 with which the enterprise system 16 and/or transactional workflow system 10 communicates to inhibit data breaches by adversaries. It can be appreciated that various cryptographic mechanisms and protocols can be chosen and implemented to suit the constraints and requirements of the particular deployment of the transactional workflow system 10 or enterprise system 16 as is known in the art.

Figure 2:
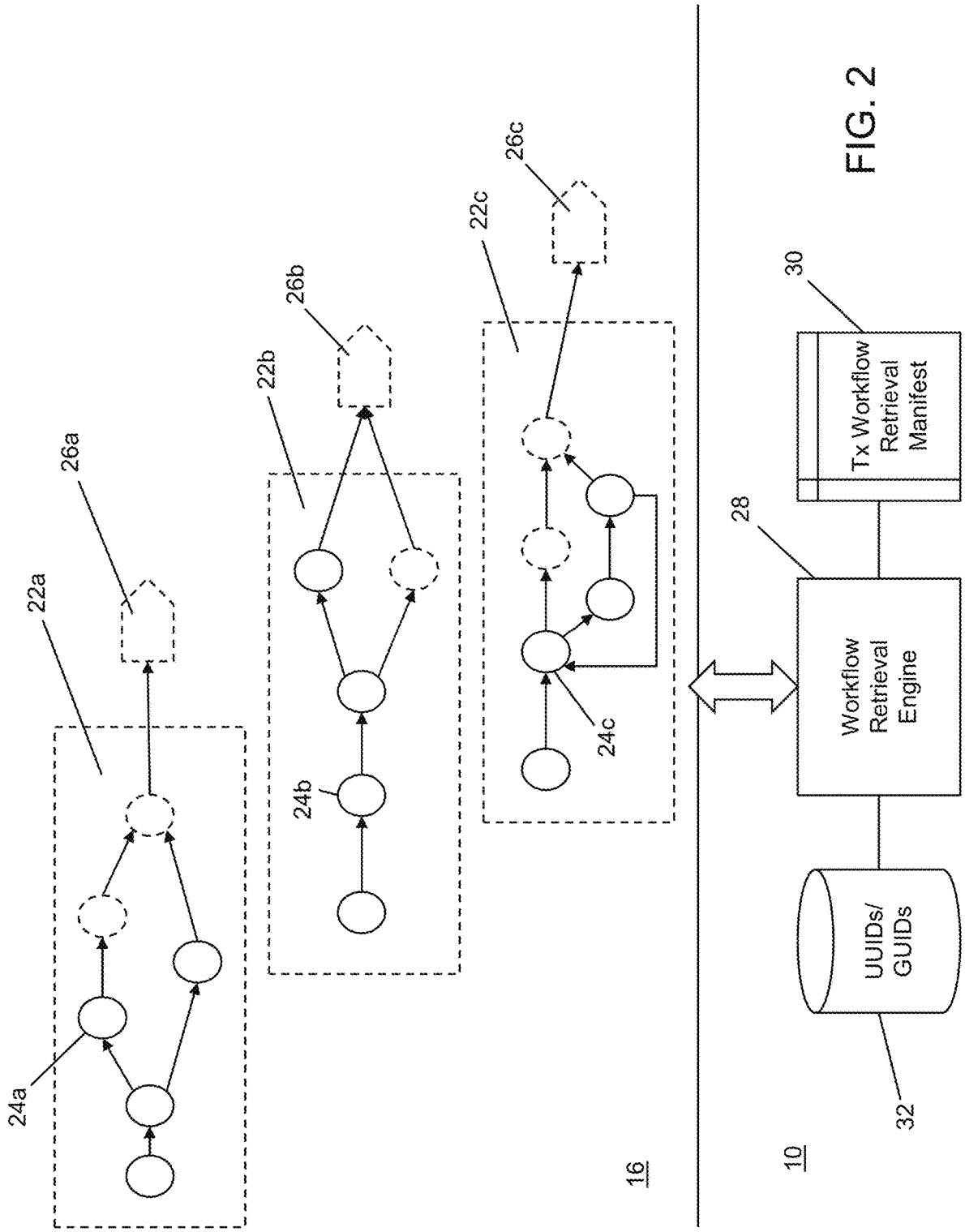
FIG. 2 is a schematic diagram of a transactional workflow system integrated with a series of independent transactional workflows handle or provided by an enterprise environment.

FIG. 2 provides a schematic illustration of the transactional workflow system 10 being integrated and interfaced with multiple parallel transactional workflows 22 executed in the enterprise system 16 to provide a backend that allows these multiple workflows 22 to be initiated, saved, retrieved, resumed, and completed from the same workflow data structure while minimizing any re-entry of information. For example, the multiple workflows 22 shown in FIG. 2 can each be associated with a different insurance policy quote or estimate that can be initiated, saved, retrieved, resumed and completed by tracking and identifying steps or nodes 24 in the workflow 22, using various electronic channels such that any progress is saved and tracked by the backend provided by a workflow retrieval engine 28 in a format that is binding (i.e., has a binding outcome 26 such that a completion of purchase or provisioning can be effected), and can be completed from the same workflow. In this way, users can avoid the need to navigate to another process or contact a live agent to lead to the binding outcome 26. It can be appreciated that while three workflows are shown in FIG. 2 this is for illustration purposes only.

In FIG. 2, there is shown a first transactional workflow 22a having a first binding result 26a (e.g., culminating in completion of a transaction). The first workflow 22a includes a number of tasks, operations, or steps, each being represented by a node 24a. The example workflow graphs shown in FIG. 2 are illustrative only. There is also shown a second transactional workflow 22b having a number of nodes 24b and a second binding result 26b. There is also shown a third transactional workflow 22c having a number of nodes 24c and a third result 26c. The results 26a, 26b, and 26c may traditionally be obtained by separately initiating each respective workflow 22a, 22b, 22c using a traditional channel such as by contacting a live agent, visiting a storefront or branch or obtaining an estimate that then requires navigation to some additional step or process to bind the result and thus complete the transaction. In particular, when more than one quote for more than one insurance policy, for example, is required, the transactional workflows have been found to be complex or better served by a human agent that can "package" everything for the user. This, however, can lead to inefficiencies and lacks a digital experience for the user. The workflow retrieval engine 28 can be provided with or as part of the transactional workflow system 10 to enable a complete end-to-end digital experience in obtaining costs estimates that can then proceed to a binding result 26 that completes the transaction, rather than only providing an estimate that would then be vetted by a live agent or other process, stage, or system.

The workflow retrieval engine 28 in FIG. 2 represents a module, algorithm, functionality, device or sub-system of the transactional workflow system 10 that can track the progress of each transactional workflow 22, e.g., using workflow graphs or other data structures that indicate not only inputs and outputs but also intermediate steps that are suitable to enable a user to save, retrieve and resume the process. For example, a specific node 24 in the workflow 22 may provide a cost estimate based on parameters entered by the user but have additional add-ons, as well as additional user information, to be entered at a later stage. The user may wish to obtain the cost estimate and save the progress while deciding whether or not to proceed to a binding outcome such as purchasing or switching an insurance policy. This is particularly advantageous when the user is contemplating multiple products (e.g., home, automobile, recreational vehicle, etc.) and is creating a budget for consideration. The ability to begin, save and retrieve the quotes at a later time and then proceed with only the remaining steps provides efficiencies both to the user and in the transactional workflow system 10 which can reduce the amount of data being stored and processing power required to reduplicate efforts. The ability to initiate, store and retrieve quotes is also advantageous in the scenario where a user wishes to evaluate different coverage for the same product being insured. In this way, the user can evaluate different combinations of parameters and compare them before proceeding with a selected option.

In addition to storing the workflows 22 in a format such as a graph that atomizes the process to a number of nodes 24, the workflow retrieval engine 28 and transactional workflow system 10 more widely can assign a universally unique identifier (UUID) or globally unique identifier (GUID) and stored such UUIDs/GUIDs 32. This provides a secure string that has a one-to-one relationship with a Quote ID for each transactional workflow 22. This unique identification enables the transactional workflow system 10 and workflow retrieval engine 28 to store, retrieve and resume workflows 22 and assign other data such as an expiry date. Such expiry dates can be used to put an upper limit on the storage of a pending quote to balance the convenience of retrieval with the storage requirements of keeping such quotes indefinitely. Moreover, since a quote related to a product like an insurance policy may become out of date and require the user to begin again in order to get an accurate and binding outcome 26. The UUIDs/GUIDs 32 and expiry dates or other parameters associated with such UUIDs/GUIDs 32 can also be used to trigger reminders, alerts and notifications related to a pending and saved quote. For example, as certain quotes are approaching expiration, the system 10 can be configured to trigger a reminder notification with a link to retrieve and resume the quote.

The workflow retrieval engine 28, in addition to identifying and retrieving workflows 22, can be responsible for authenticating a user and/or client device 12 used to engage with the transactional workflow system 10. For example, when retrieving the quote, a user may be asked to confirm their identity using a minimum of personally identifiable information (PII) and one-time-password (OTP) or other mechanism to permit the system 10 to access the corresponding workflow 22 via the associated UUID/GUID 32. The workflow retrieval engine 28 can also include or have access to a transactional workflow retrieval manifest 30 as shown in FIG. 2. The retrieval manifest 30 can be used to map UUIDs/GUIDs 32 to the quote IDs, which can be mapped to a storage location for the corresponding workflow 22. The retrieval manifest 30 can also be used to associate expiration dates, comments, alert or notification preferences or any other data or parameters that the workflow retrieval engine 28 can leverage to keep the users engaged and to encourage completion of the binding outcomes 26 or to iterate within the workflow 22 to achieve a desired outcome. For example, the transaction workflow retrieval manifest 30 can obtain contextual data from the enterprise system 16 concerning the user's past insurance purchases, any contact they have made to other channels, or user preference data from other services such as banking or investing.

Figure 3:
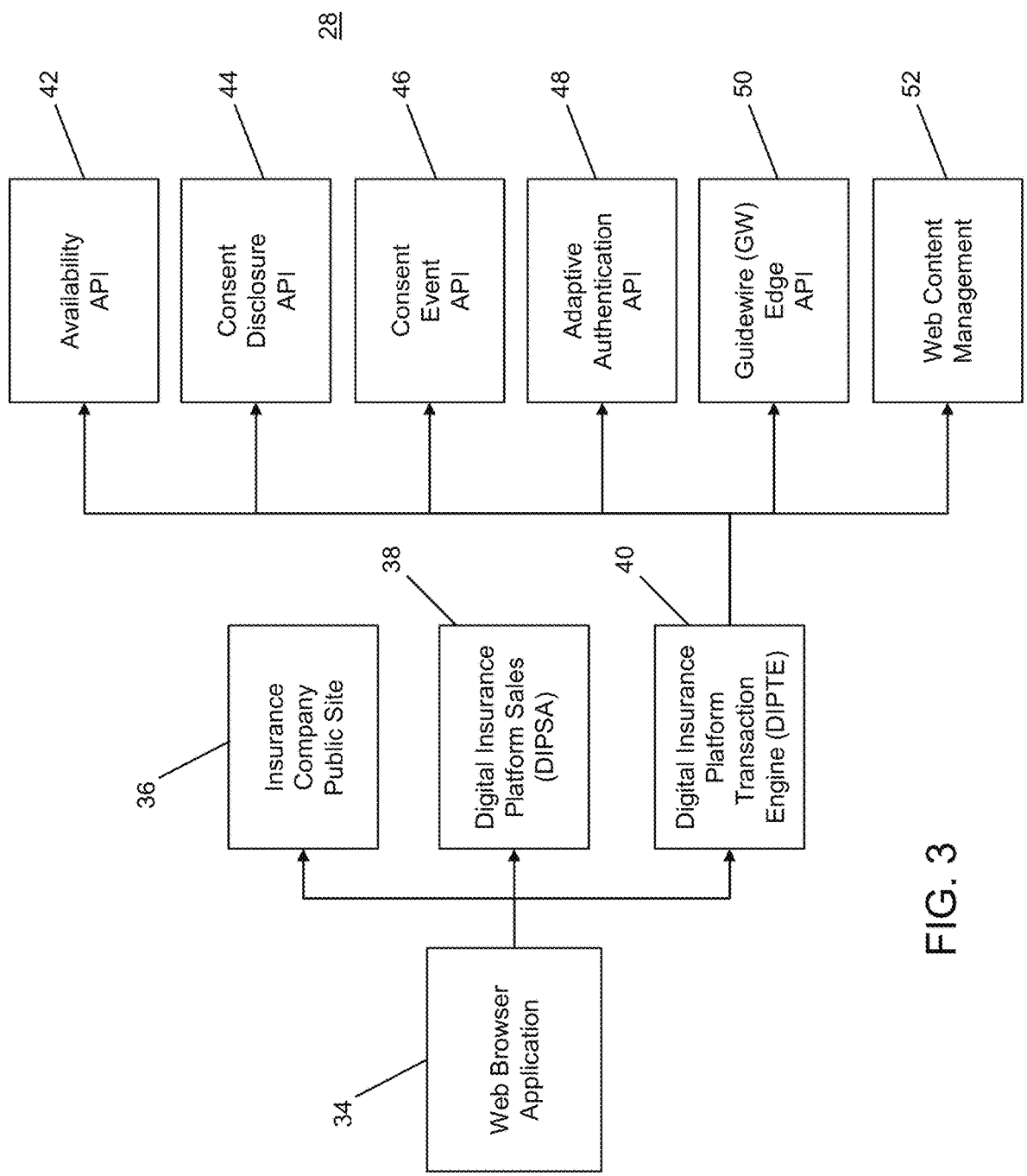
FIG. 3 is a schematic diagram of a system design for implementing a process flow for the transactional workflow system.

Referring now to FIG. 3, a system design for implementing a process flow for the transactional workflow system 10 is shown. A web browser application 34 is shown, which can be used to access the workflows 22 via the enterprise system 16 and/or transactional workflow system 10. The web browser application 34 is interfaced with an insurance company (e.g., enterprise system 16) public site 36, a digital insurance platform sales component (DIPSA) 38, and a digital insurance platform transaction engine (DIPTE) 40. The insurance company public site 36 can be configured to update one or more pages therein to add a uniform resource locator (URL) to direct customers accessing the site 36 through the web browser 34 in this example, to the DIPSA 38 to retrieve a previously completed auto, home, or other quote. As such, the DIPSA 38 can be provided by or be integrated with the transactional workflow system 10 and/or the workflow retrieval engine 28. The DIPTE 40 can be configured to implement a process flow that invokes multiple backend application programming interfaces (APIs), e.g., that are hosted and provided by the enterprise system 16, in order to retrieve the saved quote associated with the workflows 22. In this example, an availability API 42 is invoked by the DIPTE 40 to determine if a policy center is available, which is typically associated with an insurance platform such as Guidewire (GW). The DIPTE 40 can also invoke a content disclosure API 44 to retrieve a consent required for authentication of the user and invoke the consent event API 46 to record the customer consent. The DIPTE 40 can also invoke an adaptive authentication API 48 to validate the customer identity and can modify a GW Edge API 50 in this example to add a new endpoint to retrieve a list of completed insurance quotes (e.g., for home, automobile, recreational vehicle, etc.). The DIPTE 40 is also coupled to a web content management component 52, which can provide static web consent for the new user interface pages.

The APIs and other components shown in FIG. 3 can be implemented as shown in the sequence diagram provided in FIG. 4. FIGS. 4a-4j each illustrate portions of an overall sequence diagram for retrieving an in-progress transactional workflow 22 using the transactional workflow system 10. Referring first to FIG. 4a, a customer 54 is illustrated as accessing the enterprise system 16 or transactional workflow system 10 via the web browser application 34 in a first step, namely Step 0. It can be appreciated that the web browser application 34 can be accessed via a client device 12, which may include a mobile electronic device, laptop or desktop computer, etc. The customer 54 selects a "Retrieve Quote" link at step 0.1, which initiates a retrieval quote flow with the DIPSA 38 at step 0.2. The DIPSA 38 returns a sales and purchase agreement (SPA) at step 0.3 and the web browser 34 checks with the DIPTE 40 to determine the availability of the enterprise via the availability API 42 at step 0.4. Referring also to FIG. 4b, Step 0 continues at step 0.5 by the DIPTE 40 determining if the GW policy center is available via a connection with the availability API 42. In this example an "OK" is returned at step 0.6. Referring again to FIG. 4a, the DIPTE 40 then returns a "Retrieve Your Quote" page at step 0.7 to the web browser application 34.

Step 1 of the sequence diagram for retrieving a quote, is shown in FIGS. 4c and 4d. Referring first to FIG. 4c, at step 1.8, the user 54 selects a consent checkbox and enters their phone number, first name and last name in this example to provide a minimum of PII to authenticate and retrieve the quote. It may be noted that the workflow retrieval engine 28 can inhibit any further PII from being fed to the web browser application 34 until the user is authenticated. At step 1.9 the web browser 34 makes a request to retrieve the quote(s) by communicating with the DIPTE 40. Referring also to FIG. 4d, the DIPTE 40 sends a consent event for the entered phone number to the consent event API 46 at step 1.10, which returns a consent ID at step 1.11 to the DIPTE 40. The DIPTE 40 can then create a new endpoint number at step 1.12 and retrieve a list of outstanding quotes by communicating with the GW Edge API 50. The GW Edge API 50 returns a list of quote GUIDs 32 and some quote details at step 1.13 to enable the quotes to be identifiable to the customer. Referring back to FIG. 4c, at step 1.14, the DIPTE 40 returns a "Security Code Required" page to the web browser application 34.

Figure 4A:
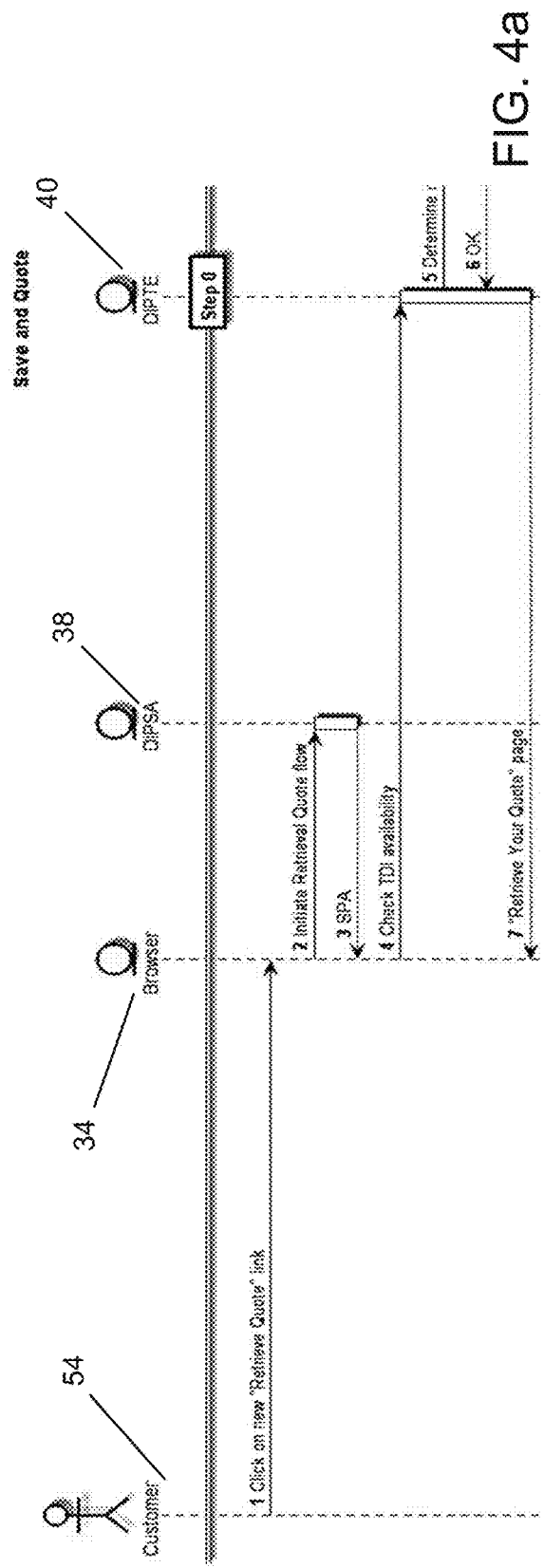
Figure 4B:
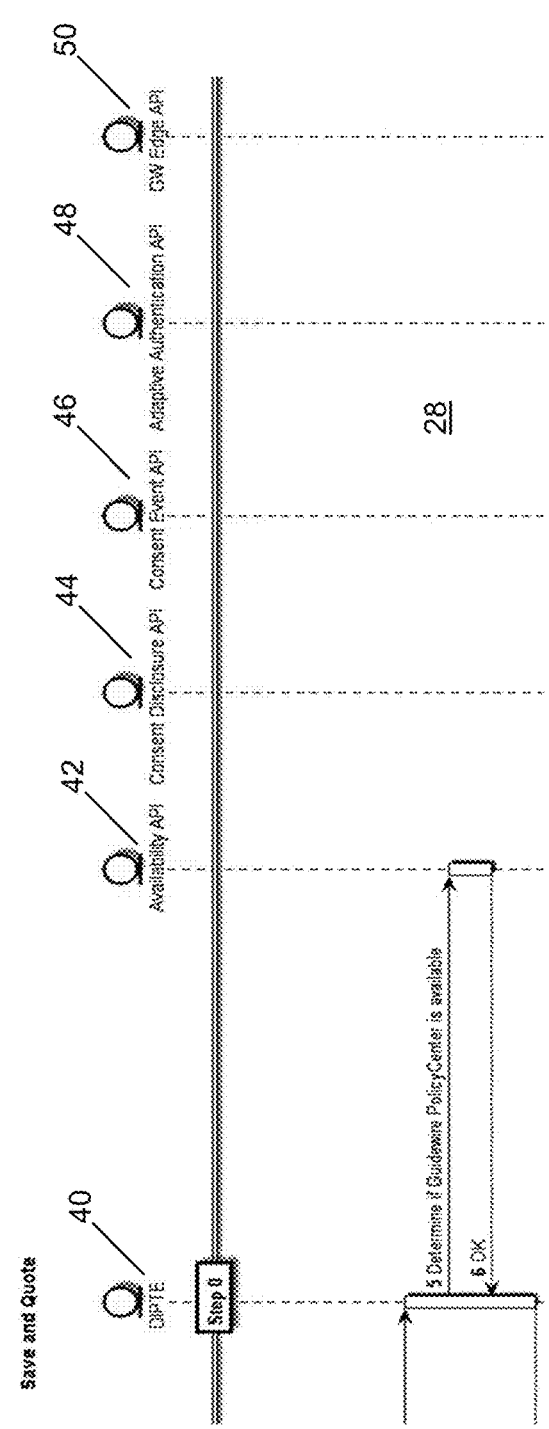
Figure 4E:
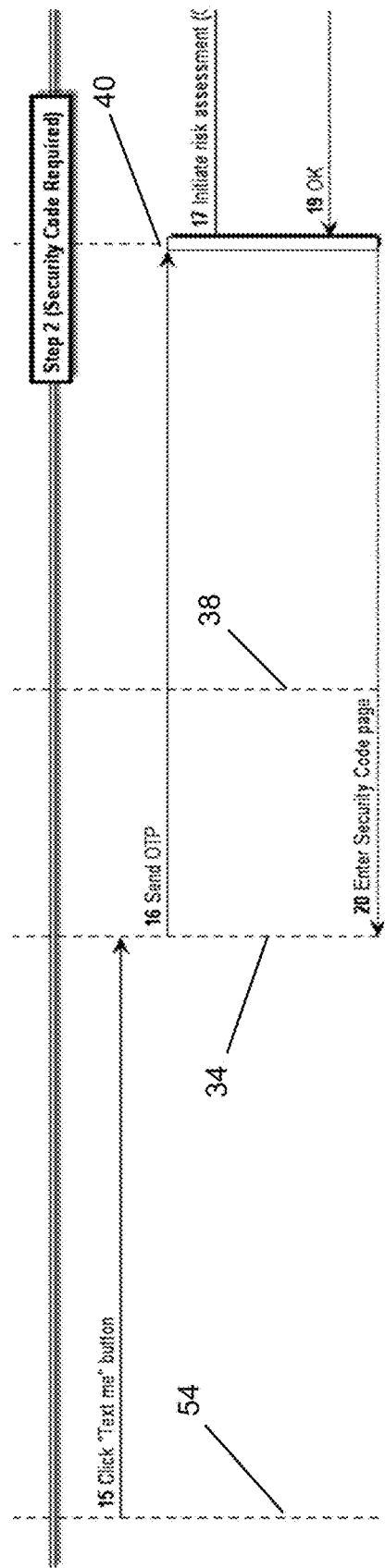
Figure 4F:
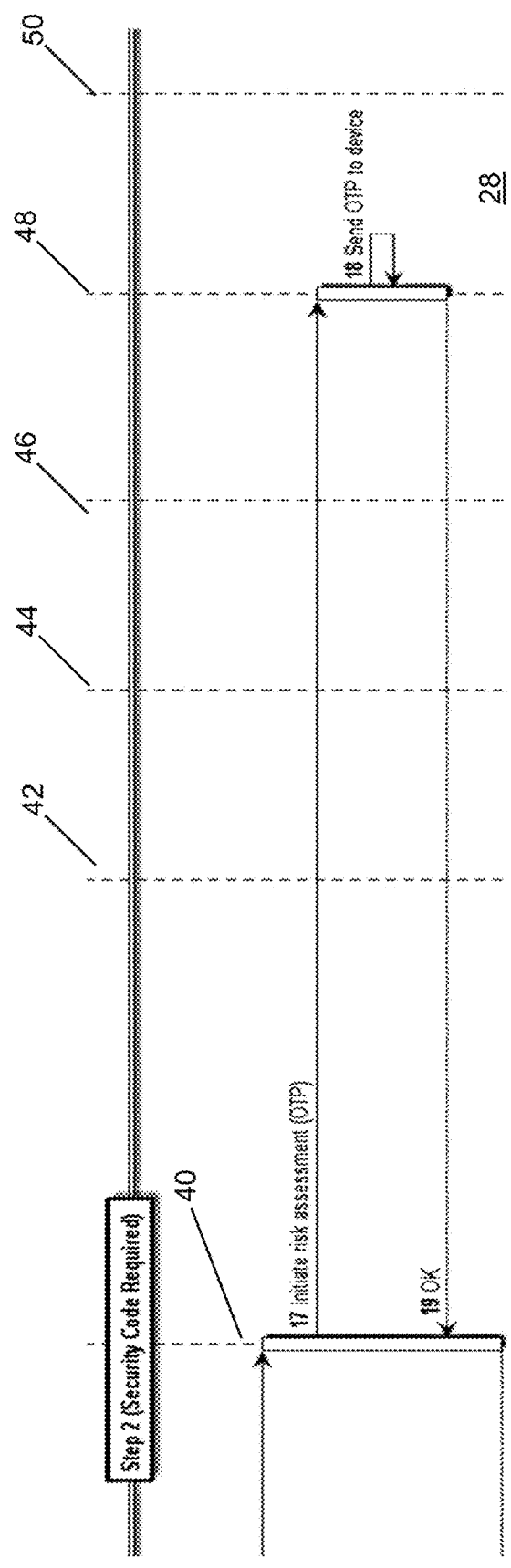

Step 2 of the sequence diagram for utilizing the security code is shown in FIGS. 4e and 4f. Referring first to FIG. 4e, at step 2.15, the user 54 can select a "Text Me" button in this example. The web browser 34 submits this selection and requests that the DIPTE 40 send an OTP at step 2.16. Referring also to FIG. 4f, the DIPTE 40 initiates a risk assessment for the OTP at step 2.17, by communicating with the adaptive authentication API 48. The adaptive authentication API 48 sends the OTP to the customer's device (e.g., client device 12) at step 2.18 and returns an "OK" to the DIPTE 40 at step 2.19. Referring again to FIG. 4e, an "Enter Security Code" page can be loaded at the web browser 34 to enable the customer 54 to enter the OTP once it has been received at its client device 12.

Figure 4G:
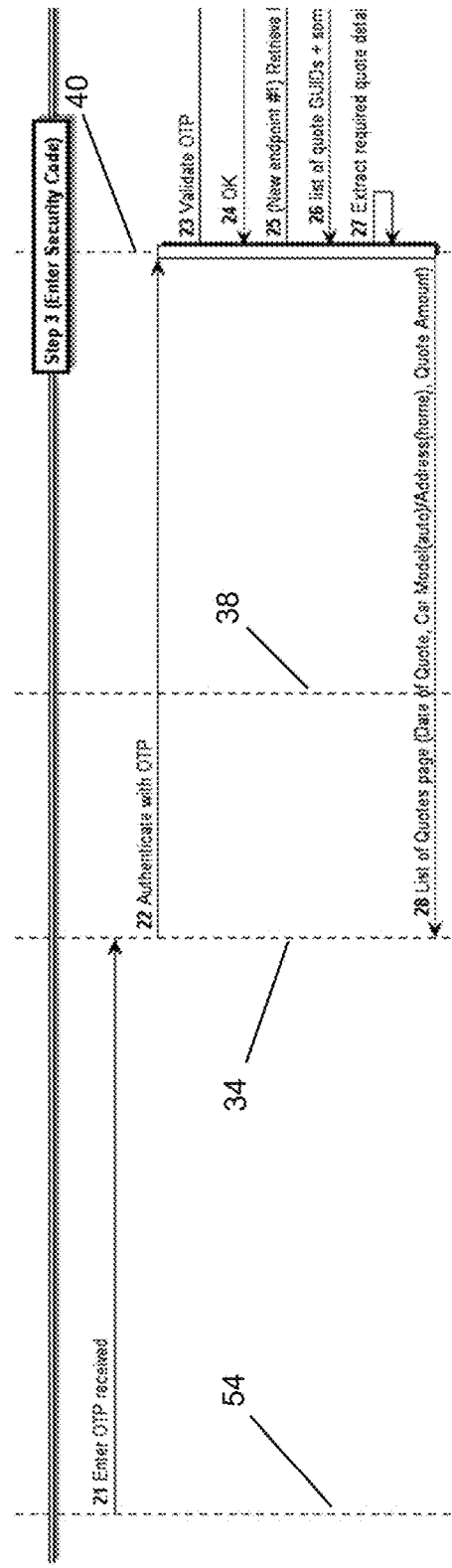
Figure 4H:
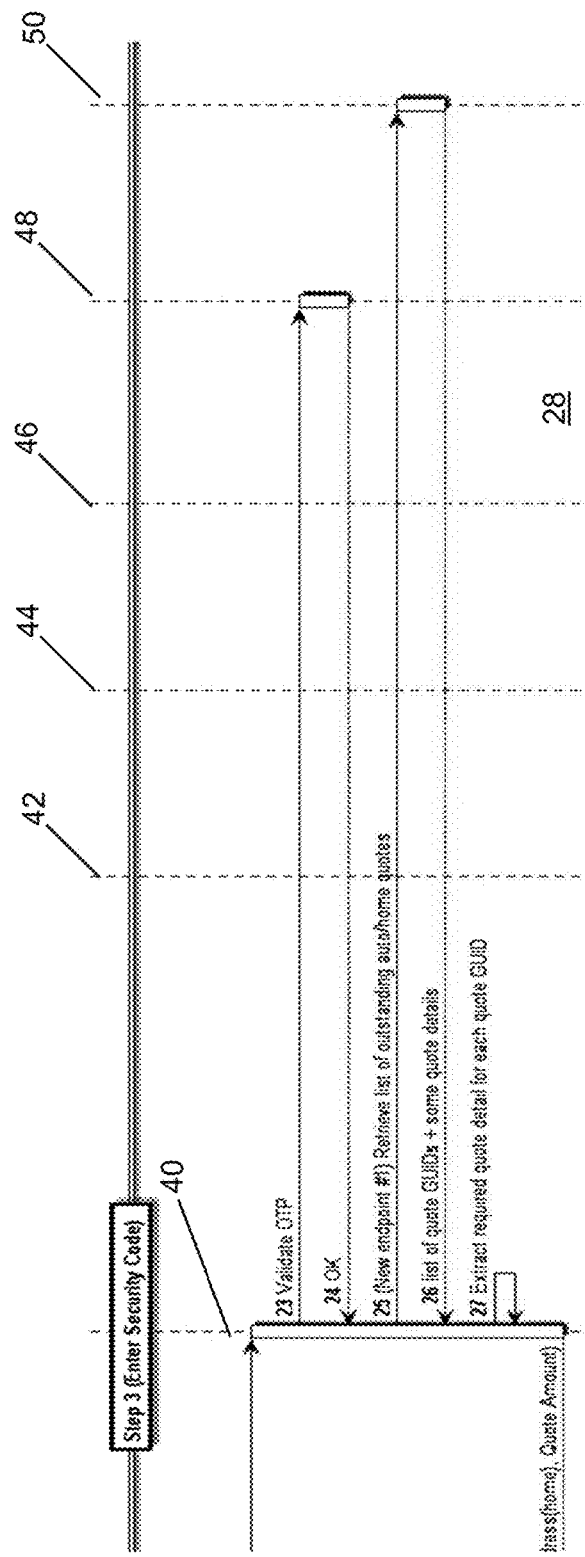

Step 3 of the sequence diagram for entering the security code is shown in FIGS. 4g and 4h. Referring first to FIG. 4g, at step 3.21, the customer 54 enters the OTP they have received via the web browser 34, which initiates an authentication with the OTP at step 3.22. Referring also to FIG. 4h, the DIPTE 40 validates the OTP at step 3.23 by communicating with the adaptive authentication API 48, which returns an "OK" message at step 3.24. The DIPTE 40 then initiates a new endpoint number at step 3.25 to retrieve a list of outstanding insurance quotes (i.e., the quotes that are pending and saved as shown in FIG. 2) by communicating with the GW Edge API 50. The GW Edge API 50 returns a list of quote GUIDs 32 and some quote details at step 3.26, which enables the DIPTE to extract the required quote details for each GUID 32 at step 3.27. Referring again to FIG. 4g, at step 3.28, a "List of Quotes" page is then displayed in the web browser 34, which can include the date of the quote, the item being insured, and the quote amount.

Figure 4I:
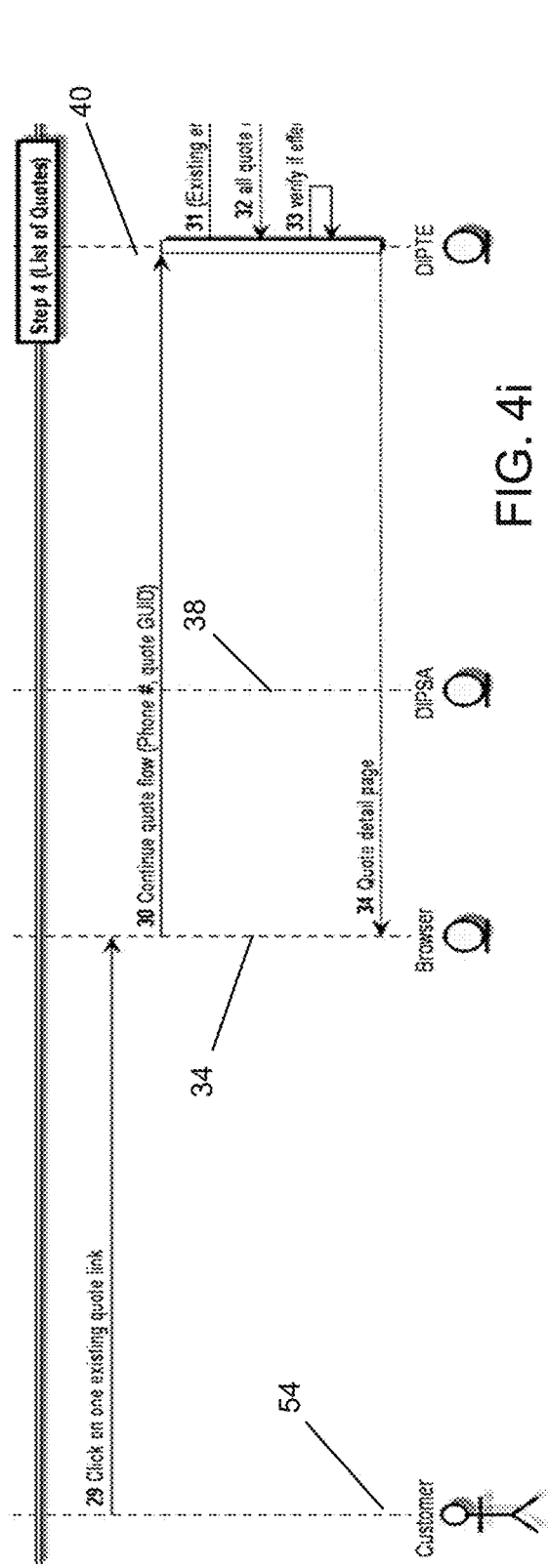
Figure 4J:
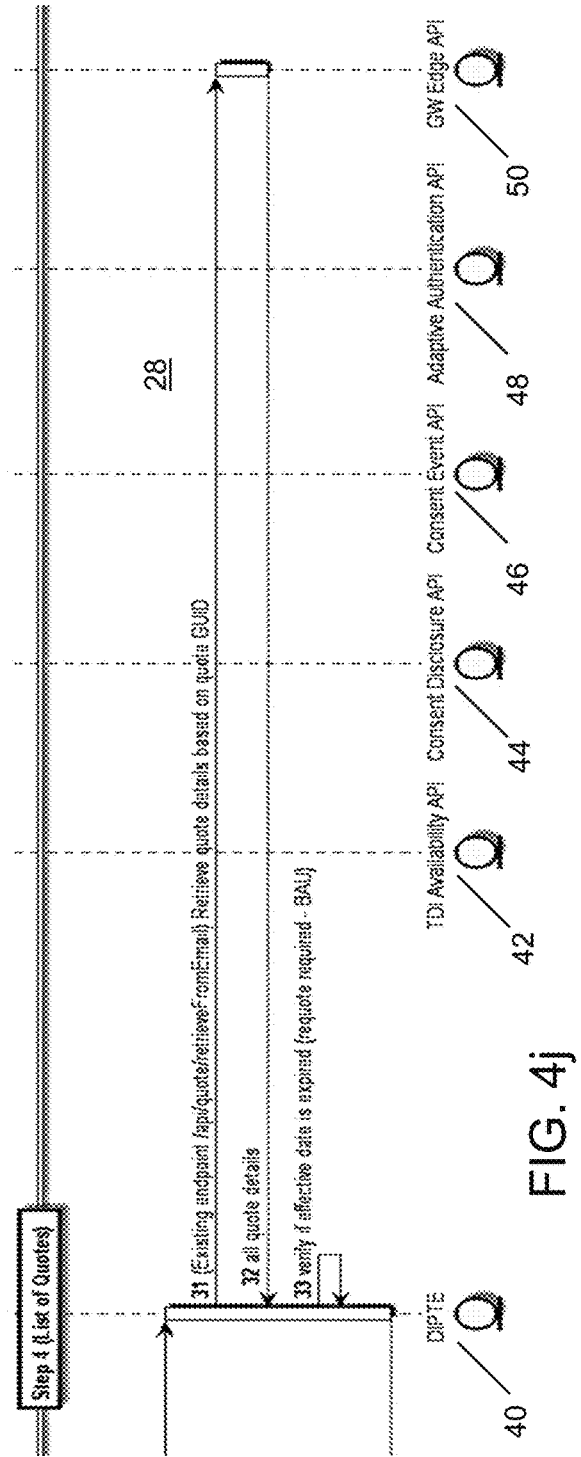

Step 4 of the sequence diagram for interacting with the List of Quotes page is shown in FIGS. 4i and 4j. Referring first to FIG. 4i, the customer 54 can select one of the existing quotes at step 4.29, which causes the web browser application 34 to initiate a continuation of the quote flow at step 4.30 by providing, for example, the phone number and GUID 32 for the associated quote. Referring also to FIG. 4j, at step 4.31, the existing endpoint that was created previously is used to retrieve the quote details based on the quote GUID 32 by communicating with the GW Edge API 50. At this point, the customer 54 has been authenticated and all quote details are returned at step 4.32 to the DIPTE 40 to enable the customer to re-enter and resume the transactional workflow 22. At step 4.33, the DIPTE 40 verifies if the effective date of the quote has expired, e.g., by accessing the retrieval manifest 30. Returning to FIG. 4i, the DIPTE 40 returns a Quote Details page at step 4.34 to the web browser application 34 to enable the user 54 to then resume the workflow 22 to achieve the binding outcome 26.

Figure 5:
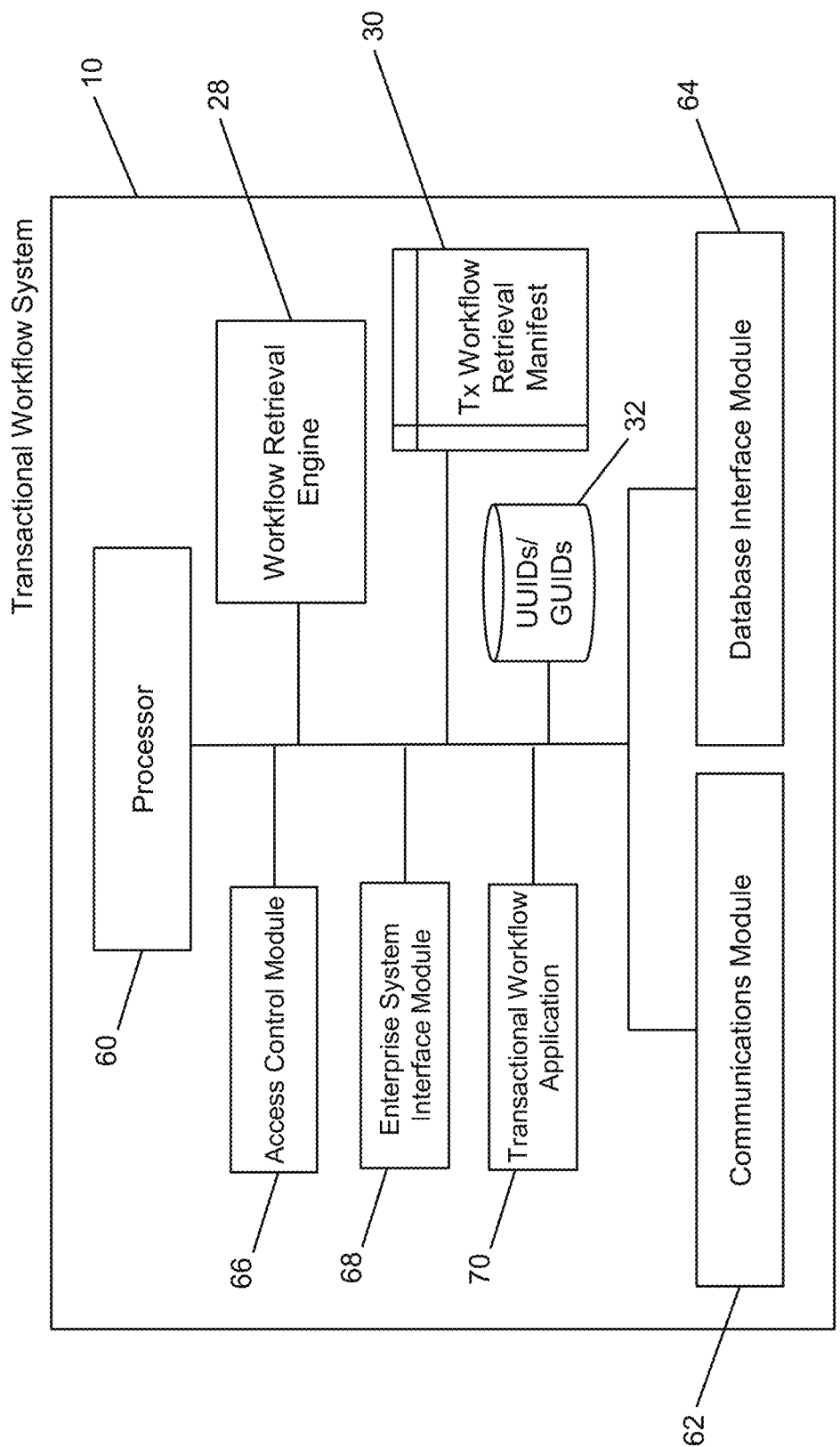
FIG. 5 is a block diagram of an example configuration of a transactional workflow system.

In FIG. 5, an example configuration of the transactional workflow system 10 is shown. In certain embodiments, the transactional workflow system 10 may include one or more processors 60, a communications module 62, and a database interface module 64 for interfacing with the datastore of workflow data 20 (and if permitted client data 18) to retrieve, modify, and store (e.g., add) data Communications module 62 enables the transactional workflow system 10 to communicate with one or more other components of the computing environment 8, such as client device 12 (or one of its components), via a bus or other communication network, such as the communication network 14. While not delineated in FIG. 5, the transactional workflow system 10 includes at least one memory or memory device that can include a tangible and non-transitory computer-readable medium having stored therein computer programs, sets of instructions, code, or data to be executed by processor 60. FIG. 5 illustrates examples of modules, tools and engines stored in memory on the transactional workflow system 10 and operated or executed by the processor 60. It can be appreciated that any of the modules, tools, and engines shown in FIG. 5 may also be hosted externally and be available to the transactional workflow system 10, e.g., via the communications module 62. In the example embodiment shown in FIG. 5, the transactional workflow system 10 includes an access control module 66, the workflow retrieval engine 28 described above, an enterprise system interface module 68, a transactional workflow application 70 (e.g., server-side insurance quote application), the datastore of UUID/GUIDs 32, and the transaction workflow retrieval manifest 30 that, as discussed above, enables the transactional workflow system 10 to store, retrieve, and resume quotes while tracking expiry dates and enable resumed workflows to lead to binding outcomes such as the purchase of an insurance policy.

While not shown in FIG. 5, it can be appreciated that the transactional workflow system 10 can also include a machine learning module and recommendation engine to enable the transactional workflow system 10 to analyze client data 18 or workflow data 20 to recommend other products or services or potential changes to a product or service, e.g., based on what other users have done. Such a recommendation engine may utilize or otherwise interface with the machine learning engine to both classify data currently being analyzed to generate a suggestion or recommendation, and to train classifiers using data that is continually being processed and accumulated by the transactional workflow system 10. This can result in a trained model used by the transactional workflow system 10 to perform such operations.

The access control module 66 may be used to apply a hierarchy of permission levels or otherwise apply predetermined criteria to determine what client data 18, workflow data 20, or financial data 88 can be shared with which entity in the computing environment 8. For example, the transactional workflow system 10 may have been granted access to certain sensitive client data 18 or financial data 88 for a user, which is associated with a certain client device 12 in the computing environment 8. Similarly, certain client profile data stored in the client data 18, workflow data 20, or financial data 88 may include potentially sensitive information such as age, date of birth, or nationality, which may not necessarily be needed by the transactional workflow system 10 to execute certain actions. As such, the access control module 66 can be used to control the sharing of certain client profile data or other transaction data and/or workflow data 20 and/or financial data 88 based on a type of client/user, a permission or preference, or any other restriction imposed by the computing environment 8 or application in which the transactional workflow system 10 is used.

The transactional workflow system 10 also includes the workflow retrieval engine 28 to enable transactional workflows and any associated systems or services in the enterprise system 16 related to such transactional workflows (e.g., insurance agents, underwriters, etc.) to communicate with the transactional workflow system 10, e.g., via an existing enterprise platform, server or other computing device. The workflow retrieval engine 28 can include or take the form of an API, software development kit (SDK) or any other software, plug-in, agent, or tool that allows the transactional workflow system 10 to be integrated with or within an application associated with the enterprise system 16 that enables the transactional workflow system 10 to interact with the transactional workflows 22. The workflow retrieval engine 28 may therefore also integrate with or be provided by the enterprise system interface module 68.

The transactional workflow system 10 may also include a transactional workflow application 70 that provides the server-side capabilities of a quotation or estimation tool or application provided by the enterprise system 16 to customers connecting to the enterprise system 16 via the client devices 12, e.g., using a website or app. The transactional workflow application 70 can also be a more general application such as an insurance storefront or sign-in based front end for insurance customers that includes a tab or page dedicated to obtaining quotes or estimates. The transactional workflow application 70 can integrate or communicate with the workflow retrieval engine 28 to interface with the enterprise system 16 if required. It can be appreciated that the transactional workflow application 70 can instead be hosted by the enterprise system 16, e.g., as part of a wider online environment and communicate with the transactional workflow system 10 via the workflow retrieval engine 28.

The enterprise system interface module 68 can provide a graphical user interface (GUI) or API connectivity to communicate with the enterprise system 16 to obtain client data 18, workflow data 20 and financial data 88 for a certain user (see FIG. 6). It can be appreciated that the enterprise system interface module 68 may also provide a web browser-based interface, an application or "app" interface, a machine language interface, etc.

The transactional workflow system 10 also includes the UUIDs/GUIDs 32 to enable the workflow retrieval engine 28 to uniquely identify individual quotes as discussed above. The transactional workflow system 10 also includes the transactional workflow retrieval manifest 30 to store, update, and reference data associated with the transactional workflows 22 to enable them to be stored and retrieved and lead to a binding outcome without the need to re-enter most or any additional information. As noted above, the manifest 30 can also track expiry dates of the quotes to provide an upper bound on the resumption of pending and saved quotes.

In FIG. 6, an example configuration of the enterprise system 16 is shown. The enterprise system 16 includes a communications module 80 that enables the enterprise system 16 to communicate with one or more other components of the computing environment 8, such as client device 12 (or one of its components) or transactional workflow system 10, via a bus or other communication network, such as the communication network 14. While not delineated in FIG. 6, the enterprise system 16 includes at least one memory or memory device that can include a tangible and non-transitory computer-readable medium having stored therein computer programs, sets of instructions, code, or data to be executed by one or more processors (not shown for clarity of illustration). FIG. 6 illustrates examples of servers and datastores/databases operable within the enterprise system 16.

It can be appreciated that any of the components shown in FIG. 6 may also be hosted externally and be available to the enterprise system 16, e.g., via the communications module 80. In the example embodiment shown in FIG. 6, the enterprise system 16 includes one or more servers to provide access to the client data 18 (which may be included with the financial data 88 or stored separately as shown in FIG. 1) and the workflow data 20, to the transactional workflow system 10, to enable the transactional workflow system 10 to interface with multiple transactional workflows 22 implemented by the enterprise system 16. Exemplary servers include a mobile application server 82, a web server 86 and a data server 90. Although not shown in FIG. 6, as noted above, the enterprise system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage for storing financial data 88.

Mobile application server 82 supports interactions with a mobile application installed on client device 12. Mobile application server 82 can access other resources of the enterprise system 16 to carry out requests made by, and to provide content and data to, a mobile application on client device 12. In certain example embodiments, mobile application server 82 supports a mobile banking or insurance application. As shown in FIG. 6, the mobile application server 82 can include a transaction (Txn) API 84 which enables the mobile application to integrate or otherwise coordinate or work with the transactional workflow system 10 to provide transactional workflow integration functionality. For example, the Txn API 84 can communicate with the transactional workflow system 10 via the enterprise system integration module 68 and/or workflow retrieval engine 28 in the transactional workflow system 10 (see FIG. 5). This allows, for example, a user to communicate with the mobile or web application(s) to initiate, store, retrieve, resume, and complete a binding outcome for an insurance product such as a policy for a home, automobile, recreational vehicle or other possessions.

Web application server 86 supports interactions using a website accessed by a web browser application 34 (see FIGS. 3 and 7) running on the client device 12. It can be appreciated that the mobile application server 82 and the web application server 86 can provide different front ends for the same application, that is, the mobile (app) and web (browser) versions of the same application. For example, the enterprise system 16 may provide an insurance or banking application that be accessed via a smartphone or tablet app while also being accessible via a browser 34 on any browser-enabled device. As shown in FIG. 6, the web application server 86 may also include a Txn API 84 to enable the web application to integrate or otherwise coordinate or work with the transactional workflow system 10 to provide parallel workflow integration functionality.

The financial data 88 may be associated with users of the client devices 12 (e.g., customers of a financial institution). The financial data 88 may include any data related to or derived from financial values or metrics associated with customers of the enterprise system 16, for example, account balances, transaction histories, line of credit available, credit scores, mortgage balances, affordability metrics, investment account balances, investment values and types, insurance policies, insurability metrics, among many others. Other metrics can be associated with the financial data 88, such as financial health data that is indicative of the financial health of the users of the client devices 12. As indicated above, it can be appreciated that the client data 18 shown in FIG. 1 may include or be part of the financial data 88 held by the enterprise system 16 and is shown separately for ease of illustration and ease of reference herein.

Figure 7:
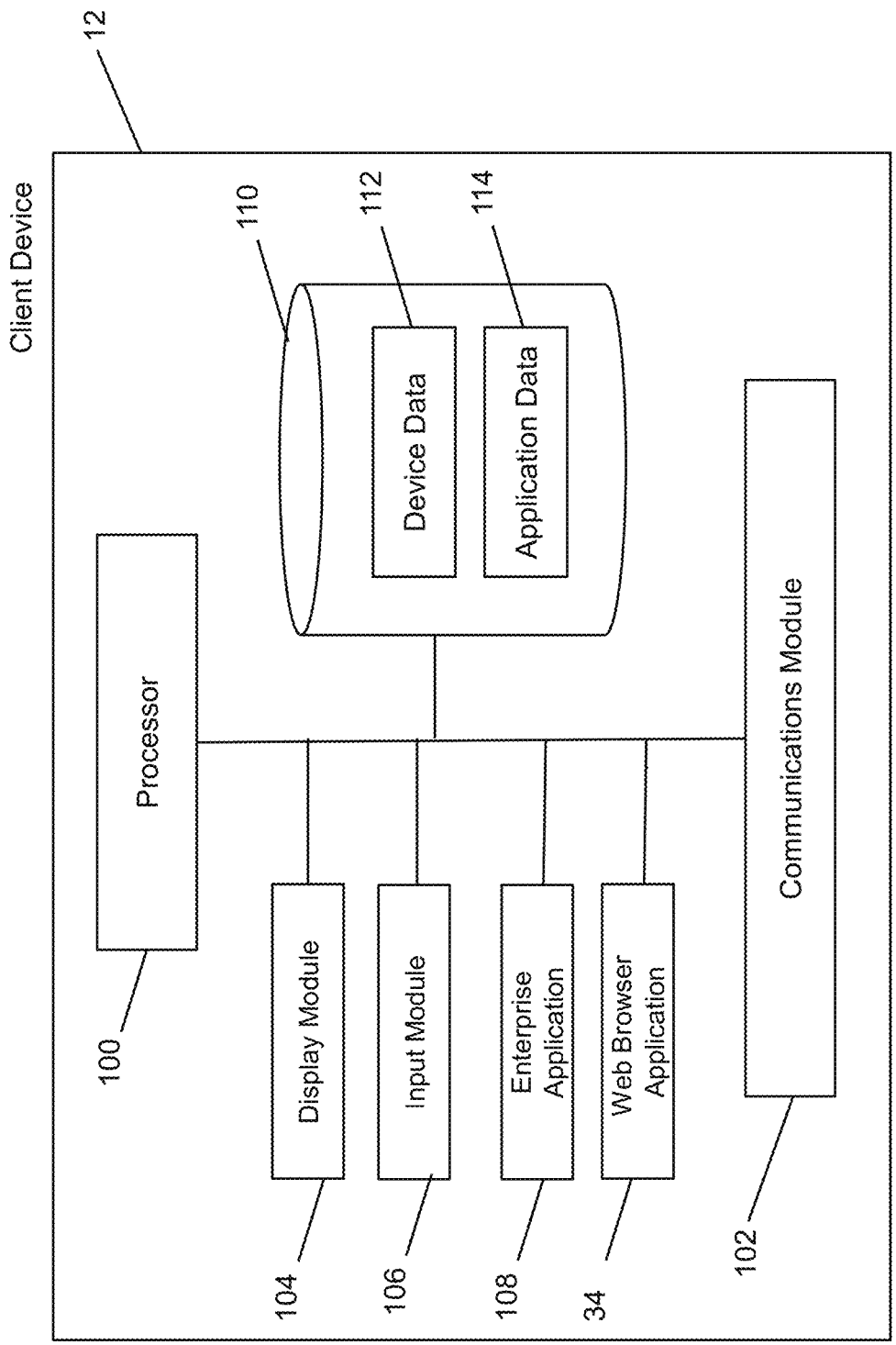
FIG. 7 is a block diagram of an example configuration of a client computing device associated with a user, customer, or client.

In FIG. 7, an example configuration of the client device 12 is shown. In certain embodiments, the client device 12 may include one or more processors 100, a communications module 102, and a data store 110 storing device data 112 and application data 114. Communications module 102 enables the client device 12 to communicate with one or more other components of the computing environment 8, such as transactional workflow system 10 or enterprise system 16, via a bus or other communication network, such as the communication network 14. While not delineated in FIG. 7, the client device 12 includes at least one memory or memory device that can include a tangible, and non-transitory computer-readable medium having stored therein computer programs, sets of instructions, code, or data to be executed by processor 100. FIG. 7 illustrates examples of modules and applications stored in memory on the client device 12 and operated by the processor 100. It can be appreciated that any of the modules and applications shown in FIG. 7 may also be hosted externally and be available to the client device 12. e.g., via the communications module 102.

In the example embodiment shown in FIG. 7, the client device 12 includes a display module 104 for rendering GUIs and other visual outputs on a display device such as a display screen, and an input module 106 for processing user or other inputs received at the client device 12, e.g., via a touch-screen, input button, transceiver, microphone, keyboard, etc. The client device 12 may also include an enterprise application 108 provided by the enterprise system 16, e.g., for performing mobile insurance, banking, or other financial product or services. The client device 12 in this example embodiment also includes a web browser application 34 for accessing Internet-based content, e.g., via a mobile or traditional website. The data store 110 may be used to store device data 112, such as, but not limited to, an IP address or a MAC address that uniquely identifies client device 12 within environment 8. The data store 110 may also be used to store application data 114, such as, but not limited to, login credentials, user preferences, cryptographic data (e.g., cryptographic keys), etc.

It will be appreciated that only certain modules, applications, tools and engines are shown in FIGS. 2 to 7 for ease of illustration and various other components would be provided and utilized by the transactional workflow system 10, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in transactional workflow system 10 or enterprise system 16, or client device 12, or accessible or connectable thereto. Any application or module herein described may be implemented using computer readable/executable instructions that may be stored or otherwise held by such computer readable media.

Figure 8:
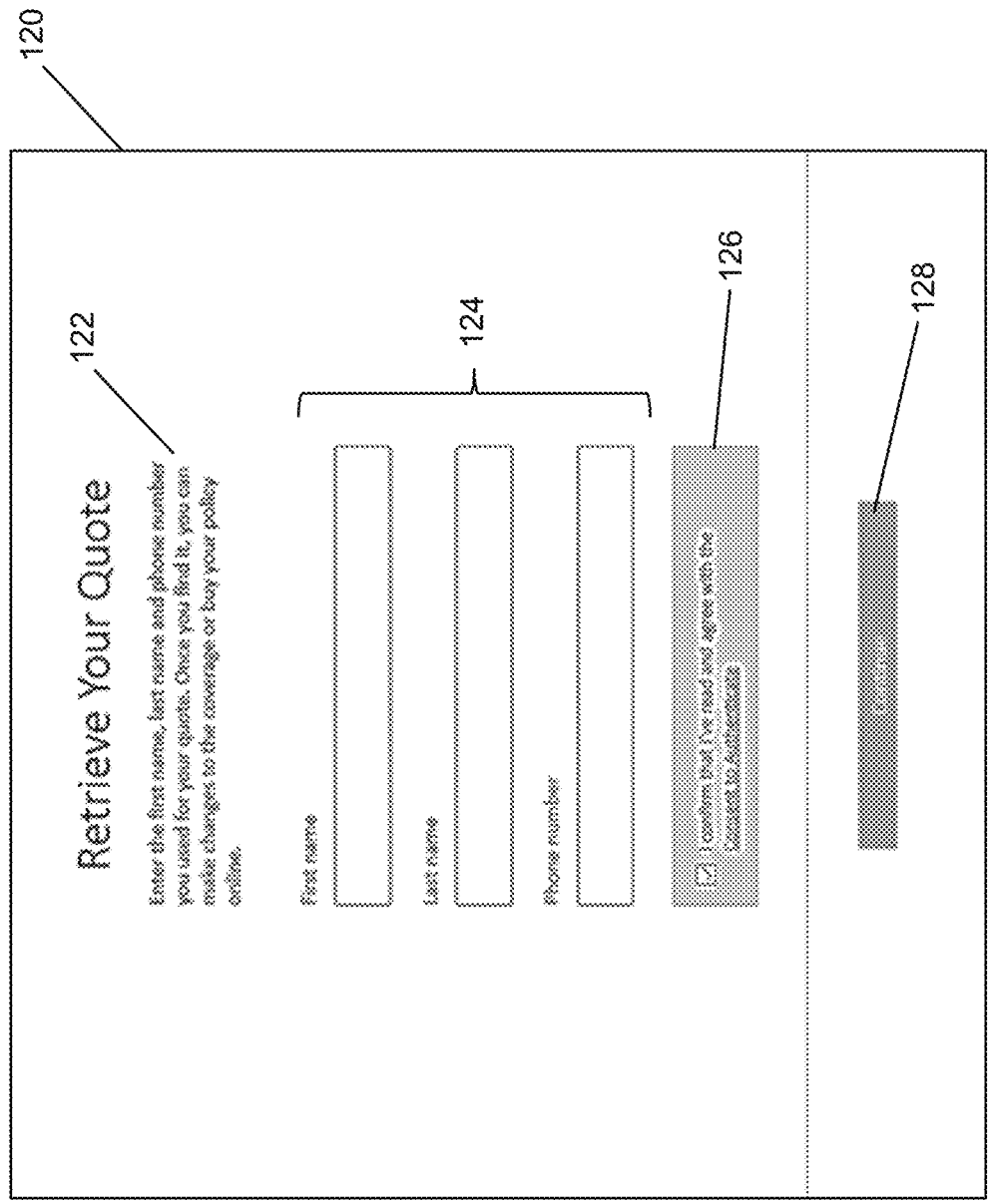
FIG. 8 is an example of a graphical user interface for retrieving a quote.

Turning now to FIG. 8, a screen shot of an example of a GUI for a Retrieve Your Quote page 120 is shown. It can be appreciated that the screen shot 120 can be provided via the enterprise application 108, web browser application 34, or transactional workflow application 70 (e.g., via the enterprise application 108 and/or web browser application 34 through integration with the enterprise system interface module 68). The page 120 includes an explanatory or instructional portion 122, which is this example asks the user to enter a first name, last name, and phone number that were used in generating the quote originally. The portion 122 also explains that once the user finds the quote, changes can be made to the coverage and/or the policy can be purchased online, i.e., the binding outcome 26 can be obtained. The page 120 includes a set of fields 124 for entering the requested information, a consent checkbox 126 to obtain any required or desired consents, and a continue button 128 to enable the user to submit the information entered in the fields 124.

Figure 9:
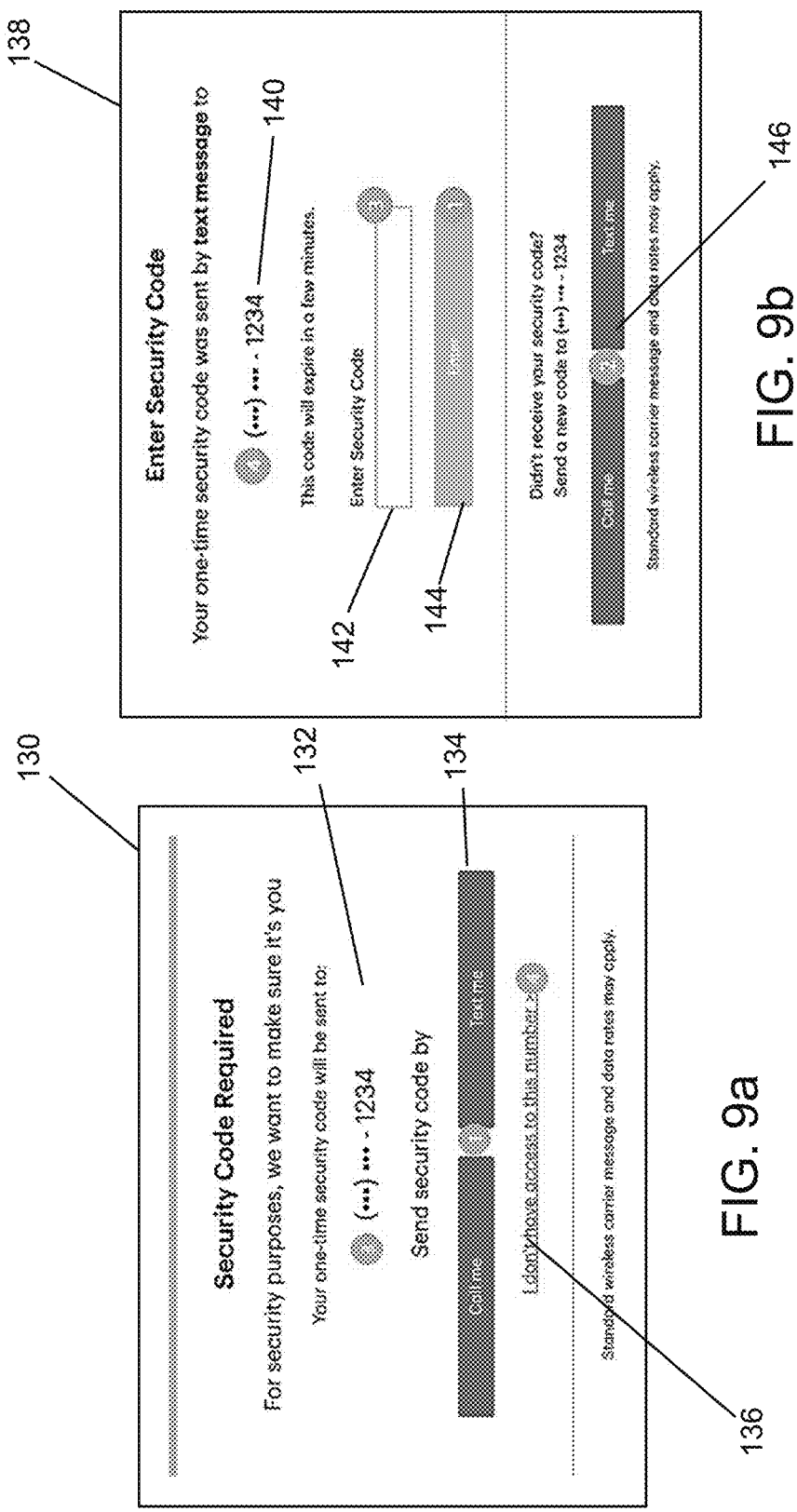
FIGS. 9a and 9b are example graphical user interfaces for obtaining a security code to be authenticated to retrieve a quote.

FIGS. 9a and 9b are screen shots of example graphical user interfaces for a Security Code Required page 130 and an Enter Security Code page 138. Referring first to FIG. 9a, the page 130 can include a masked indicator 132 of the number to which the security code will be sent, and a set of options 134 for obtaining the security code, for example "Call Me" or "Text Me" if the phone number is a mobile device number. The page 130 also includes an option 136 to select a different number, e.g., if the masked indicator 132 is associated with a phone number at a location or device where the user is not located. Referring now to FIG. 9b, the page 138 also uses a masked indicator 140 to identify the number to which the code was sent and provides a code entry box 142 to enable the user to enter the received OTP, i.e., the security code in this example. An entry button 144 is provided to enable the user to submit the code, and a set of options 146 is provided to enable the user to have the code resent, e.g., if they did not receive the first attempt.

Figure 10:
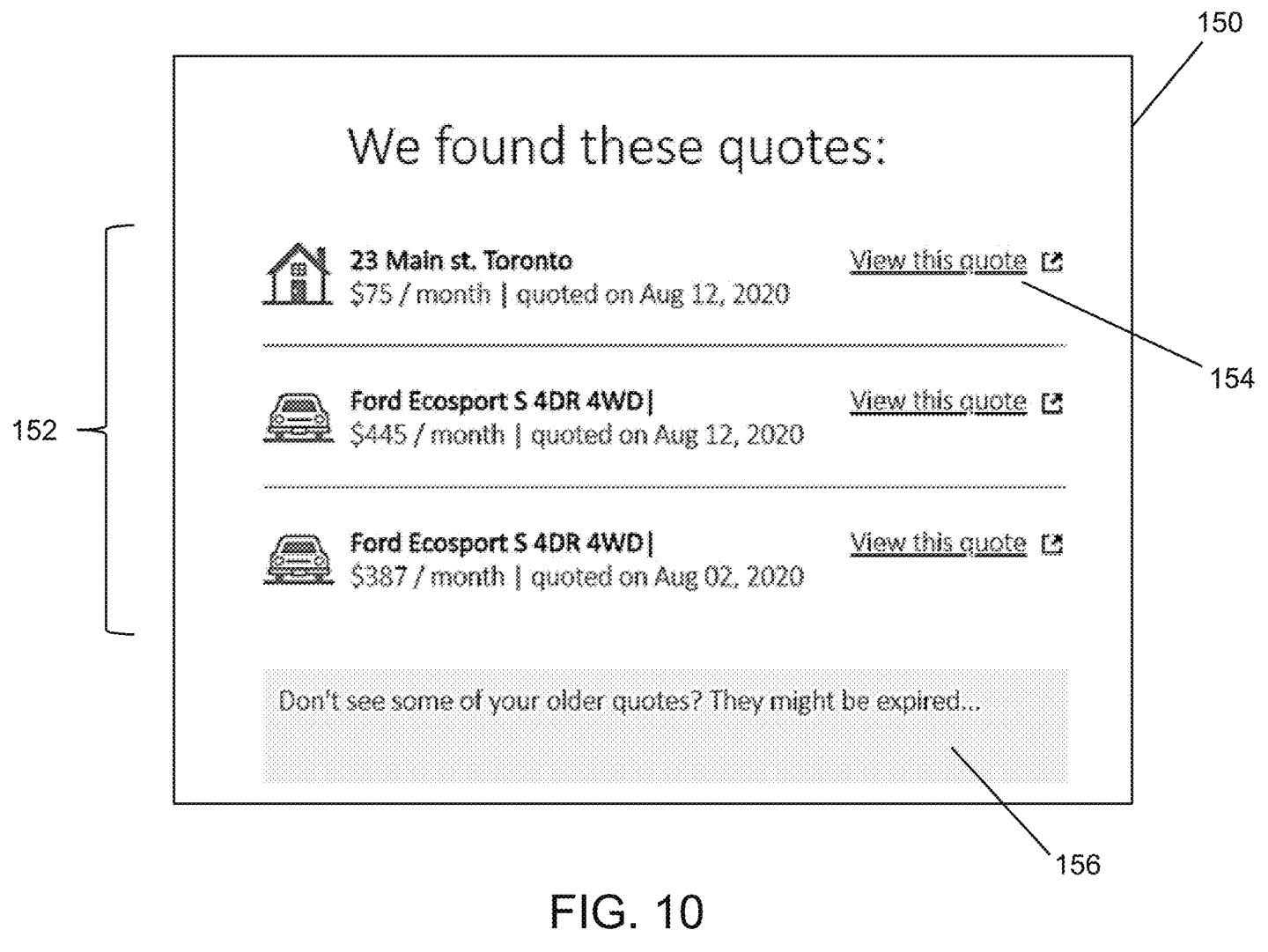

FIG. 10 is a screen shot of an example of a graphical user interface for a We Found These Quotes page 150 for displaying multiple retrieved quotes, and to enable resumption of same. The page 150 includes a list 152 of the quotes with corresponding options 154 to view more details concerning the quote. As discussed above, a limited or subset of quote details can be provided to enable the user to identify a quote that they wish to resume with additional details being provided once the user is authenticated, which can be pulled into the user interface by selecting one of the options 154. Additional quotes which have expired may be viewed through the element 156 (e.g., via link, or a listing in element 156), shown by the companion text "Don't see some of your older quotes? They might be expired . . . ". It may be observed from FIG. 10 that the user has multiple active and saved quotes for the same item, illustrating the flexibility provided by allowing the user to try out different options and parameters before committing to a policy.

Figure 11:
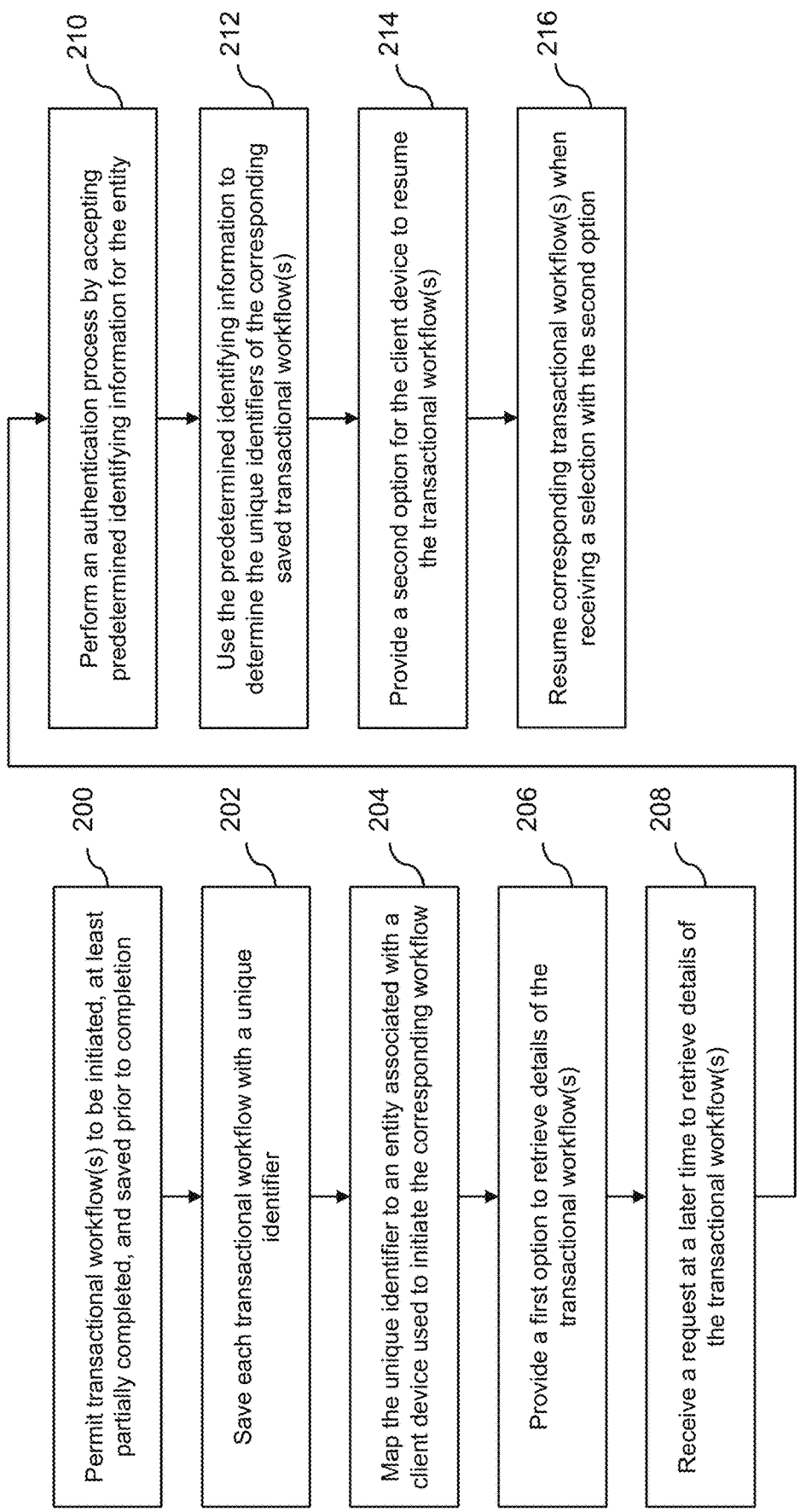
FIG. 11 is a flow diagram of an example of computer executable instructions for managing multiple transactional workflows.

Referring to FIG. 11, an example embodiment of computer executable instructions for managing multiple transactional workflows 22 is shown. At block 200, the transactional workflow system 10 permits one or more transactional workflows 22 to be initiated, at least partially completed and saved prior to completion. For example, the enterprise system 16 can enable a user to begin obtaining quotes via a mobile or web application and also progress to be saved in the way shown in FIG. 2. At block 202, the transactional workflow system 10 saves each transactional workflow 22 with a unique identifier, e.g., a UUID/GUID 32. The identifier is then mapped to an entity associated with a client device 12 used to initiate the corresponding workflow 22, at block 204, e.g., the customer 54. At block 206, the transactional workflow system 10 provides a first option to retrieve details of the transactional workflow(s) 22, e.g., page 120 shown in FIG. 8. This page 120 can be accessed at a later time by the user 54 to request that the transactional workflow system 10 retrieve details of the transactional workflow(s) 22 at block 208.

The transactional workflow system 10 then performs an authentication process by accepting predetermined identifying information for the entity at block 210, e.g., using pages 120, 130, 138. At block 212, the transactional workflow system 10 uses the predetermined identifying information to determine the unique identifies of the corresponding saved transactional workflows 22 and provides a second option for the client device 12 to resume one or more of the transactional workflows 22 at block 214, e.g., options 154 on page 150 shown in FIG. 10. At block 216, the transactional workflow system 10 resumes the corresponding transactional workflow 22 when receiving a selection with the second option. In this way, each transactional workflow 22 is saved in a format that permits a server device utilized by the transactional workflow system 10 to execute and complete a binding outcome 26 in obtaining the product or service upon resumption of the transactional workflow 22.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for managing multiple transactional workflows, the server device comprising:
   a processor;
   a memory coupled to the processor, the memory storing computer executable instructions that when executed by the processor cause the processor to:
      permit, by a client device, a plurality of transactional workflows for a product or service to be initiated, at least partially completed, and saved by the client device on the server device, prior to completion;
      save each transactional workflow of the plurality of transactional workflows to a corresponding storage location;
      update a retrieval manifest associated with each transactional workflow with a unique identifier, the retrieval manifest mapping the unique identifier to the corresponding storage location for each transactional workflow;
      map the unique identifier to an entity associated with the client device, wherein the client device is used to initiate a corresponding transactional workflow;
      provide a first option for the client device to retrieve, from the server device, details of the plurality of transactional workflows;
      receive a request at a later time to retrieve details of the plurality of transactional workflows;
      provide an interface and receive, at the interface, predetermined identifying information to perform authentication of a user associated with the request with the server device;
      perform an authentication process based on the predetermined identifying information received in the interface, the authentication process authenticating the client device with the server device, wherein the predetermined identifying information is for the entity;

use the predetermined identifying information to determine the unique identifier of each transactional workflow;

provide a second option for the client device to resume one or more transactional workflows of the plurality of transactional workflows, wherein the one or more transactional workflow of the plurality of transactional workflows are associated with the determined unique identifiers;

in response to a corresponding selection associated with the second option:

retrieve the corresponding storage location of the one or more transactional workflows of the plurality of transactional workflows from the retrieval manifest; and serve workflow elements based on information recovered from the storage location to resume the one or more transactional workflows of the plurality of transactional workflows;

wherein each transactional workflow is saved in a format that permits the server device to execute and complete a binding outcome in obtaining the product or the service upon resumption of the one or more transactional workflows of the plurality of corresponding-transactional workflows.

2. The server device of claim 1, wherein the predetermined identifying information comprises limited information to avoid storing personally identifiable information during a current session and not returning the personally identifiable information until the client device is authenticated.

3. The server device of claim 2, wherein the limited information comprises a phone number used to initiate the authentication process using a security code.

4. The server device of claim 1, wherein the computer executable instructions further cause the processor to:

track an expiry date, via the retrieval manifest, associated with the corresponding transactional workflow of the plurality of transactional workflows;

mark the corresponding transactional workflow as an expired transactional workflow after the expiry date; and provide an indication of the expiry date passing to the client device.

5. The server device of claim 4, wherein the indication of the expiry date passing is provided in response to attempting to retrieve the expired transactional workflow from the retrieval manifest.

6. The server device of claim 4, wherein the indication of the expiry date passing is provided prior to the expiry date to enable resumption of the corresponding transactional workflow prior to the expiry date.

7. The server device of claim 1, wherein the request is initiated from a reminder sent to the client device by the server device.

8. The server device of claim 1, wherein corresponding storage locations store each transactional workflow based on graphs that atomize the process into a plurality of nodes.

9. The server device of claim 8, wherein a website comprises an account for the entity associated with the client device.

10. The server device of claim 1, wherein the retrieval manifest comprises preference data for displaying the plurality of transactional workflows.

11. A method of managing multiple transactional workflows, the method executed by a server device and comprising:

permitting, by a client device, a plurality of transactional workflows for a product or service to be initiated, at least partially completed, and saved by the client device on the server device, prior to completion;

saving each transactional workflow of the plurality of transactional workflows to a corresponding storage location;

updating a retrieval manifest associated with each transactional workflow with a unique identifier, the retrieval manifest mapping the unique identifier to the corresponding storage location for each transactional workflow;

mapping the unique identifier to an entity associated with the client device, wherein the client device is used to initiate a corresponding transactional workflow;

providing a first option for the client device to retrieve, from the server device, details of the plurality of transactional workflows;

receiving a request at a later time to retrieve details of the plurality of transactional workflows;

providing an interface and receive, at the interface, predetermined identifying information to perform authentication of a user associated with the request with the server device;

performing an authentication process based on the predetermined identifying information received in the interface, the authentication process authenticating the client device with the server device, wherein the predetermined identifying information is for the entity;

using the predetermined identifying information to determine the unique identifier of each transactional workflow;

providing a second option for the client device to resume one or more transactional workflows of the plurality of transactional workflows, wherein the one or more transactional workflow of the plurality of transactional workflows are associated with the determined unique identifiers; and in response to a corresponding selection associated with the second option:

retrieving the corresponding storage location of the one or more transactional workflows of the plurality of transactional workflows from the retrieval manifest; and serving workflow elements based on information recovered from the storage location to resume the one or more transactional workflows of the plurality of transactional workflows;

wherein each transactional workflow is saved in a format that permits the server device to execute and complete a binding outcome in obtaining the product or the service upon resumption of the one or more transactional workflows of the plurality of transactional workflows.

12. The method of claim 11, wherein the predetermined identifying information comprises limited information to avoid storing personally identifiable information during a current session and not returning the personally identifiable information until the client device is authenticated.

13. The method of claim 11, further comprising:

tracking an expiry date associated with the corresponding transactional workflow of the plurality of transactional workflows;

marking the corresponding transactional workflow as an expired transactional workflow after the expiry date; and providing an indication of the expiry date passing to the client device.

14. The method of claim 13, wherein the indication of the expiry date passing is provided in response to attempting to retrieve the expired transactional workflow.

15. The method of claim 13, wherein the indication of the expiry date passing is provided prior to the expiry date to enable resumption of the corresponding transactional workflow prior to the expiry date.

16. The method of claim 11, wherein the request is initiated from a reminder sent to the client device by the server device.

17. The method of claim 11, wherein the format represents each transactional workflow based on graphs that atomize the process into a plurality of nodes.

18. The method of claim 11, wherein the retrieval manifest comprises preference data for displaying the plurality of transactional workflows.

19. A non-transitory computer readable medium for managing multiple transactional workflows, the computer readable medium comprising computer executable instructions for:

permitting, by a client device, a plurality of transactional workflows for a product or service to be initiated, at least partially completed, and saved by the client device on the server device, prior to completion;

saving each transactional workflow of the plurality of transactional workflows to a corresponding storage location;

updating a retrieval manifest associated with each transactional workflow with a unique identifier, the retrieval manifest mapping the unique identifier to the corresponding storage location for each transactional workflow;

mapping the unique identifier to an entity associated with the client device, wherein the client device is used to initiate a corresponding transactional workflow;

providing a first option for the client device to retrieve, from a server device, details of the plurality of transactional workflows;

receiving a request at a later time to retrieve details of the plurality of transactional workflows;

providing an interface and receive, at the interface, predetermined identifying information to perform authentication of a user associated with the request with the server device;

performing an authentication process based on the predetermined identifying information received in the interface, the authentication process authenticating the client device with the server device, wherein the predetermined identifying information is for the entity;

using the predetermined identifying information to determine the unique identifier of each transactional workflow;

providing a second option for the client device to resume one or more transactional workflows of the plurality of transactional workflows, wherein the one or more transactional workflow of the plurality of transactional workflows are associated with the determined unique identifiers; and in response to a corresponding selection associated with the second option:

retrieving the corresponding storage location of the one or more transactional workflows of the plurality of transactional workflows from the retrieval manifest; and serving workflow elements based on information recovered from the storage location to resume the one or more transactional workflows of the plurality of transactional workflows;

wherein each transactional workflow is saved in a format that permits the server device to execute and complete a binding outcome in obtaining the product or the service upon resumption of the one or more transactional workflows of the plurality of transactional workflows.

* * * * *